(12) United States Patent
Eun

(10) Patent No.: US 7,663,778 B2
(45) Date of Patent: Feb. 16, 2010

(54) DOCUMENT PROCESSOR, IMAGE FORMING APPARATUS, DOCUMENT PROCESSING METHOD, AND COMPUTER PROGRAM

(75) Inventor: Jongsook Eun, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 786 days.

(21) Appl. No.: 11/344,012

(22) Filed: Feb. 1, 2006

(65) Prior Publication Data

US 2006/0171005 A1    Aug. 3, 2006

(30) Foreign Application Priority Data

Feb. 2, 2005   (JP) .............................. 2005-026762

(51) Int. Cl.
*H04N 1/40* (2006.01)
*H04N 1/04* (2006.01)
*G06K 15/00* (2006.01)

(52) U.S. Cl. ...................... 358/1.18; 358/443; 358/445; 358/448

(58) Field of Classification Search .................. 358/1.3, 358/1.4, 500, 501, 505, 474, 514, 400, 401, 358/407, 443, 445, 448, 523; 382/298
See application file for complete search history.

(56) References Cited

U.S. PATENT DOCUMENTS 6,260,160 B1 * 7/2001 Beyda et al. .................. 714/27
7,250,979 B2 * 7/2007 Choi .......................... 348/441
7,304,958 B2 * 12/2007 Nelson et al. ................ 370/249
2004/0218094 A1 * 11/2004 Choi .......................... 348/441
2006/0215217 A1 * 9/2006 Ujigawa ..................... 358/1.15
2007/0002175 A1 * 1/2007 Narushima et al. .......... 348/552

FOREIGN PATENT DOCUMENTS

| JP | 08223342 | * | 8/1996 |
| JP | 11-327883 | | 11/1999 |
| JP | 2002-084383 | | 3/2002 |

* cited by examiner

*Primary Examiner*—Jerome Grant, II
(74) *Attorney, Agent, or Firm*—Harness, Dickey & Pierce, PLC

(57) ABSTRACT

In a multifunction product including a plurality of input sources and a plurality of output destinations corresponding to the function thereof, there are an input document class that fits an input document input from the input source to a common format regardless of the input sources and manages the input document, a user document class that obtains user images of a predetermined size to be processed from the input document and manages the user document formed of the obtained user images, and an output document class that uses the output image created from the user images constituting the user document to create an output document reshaped in a format to be output to the output destination and output the output document.

12 Claims, 24 Drawing Sheets

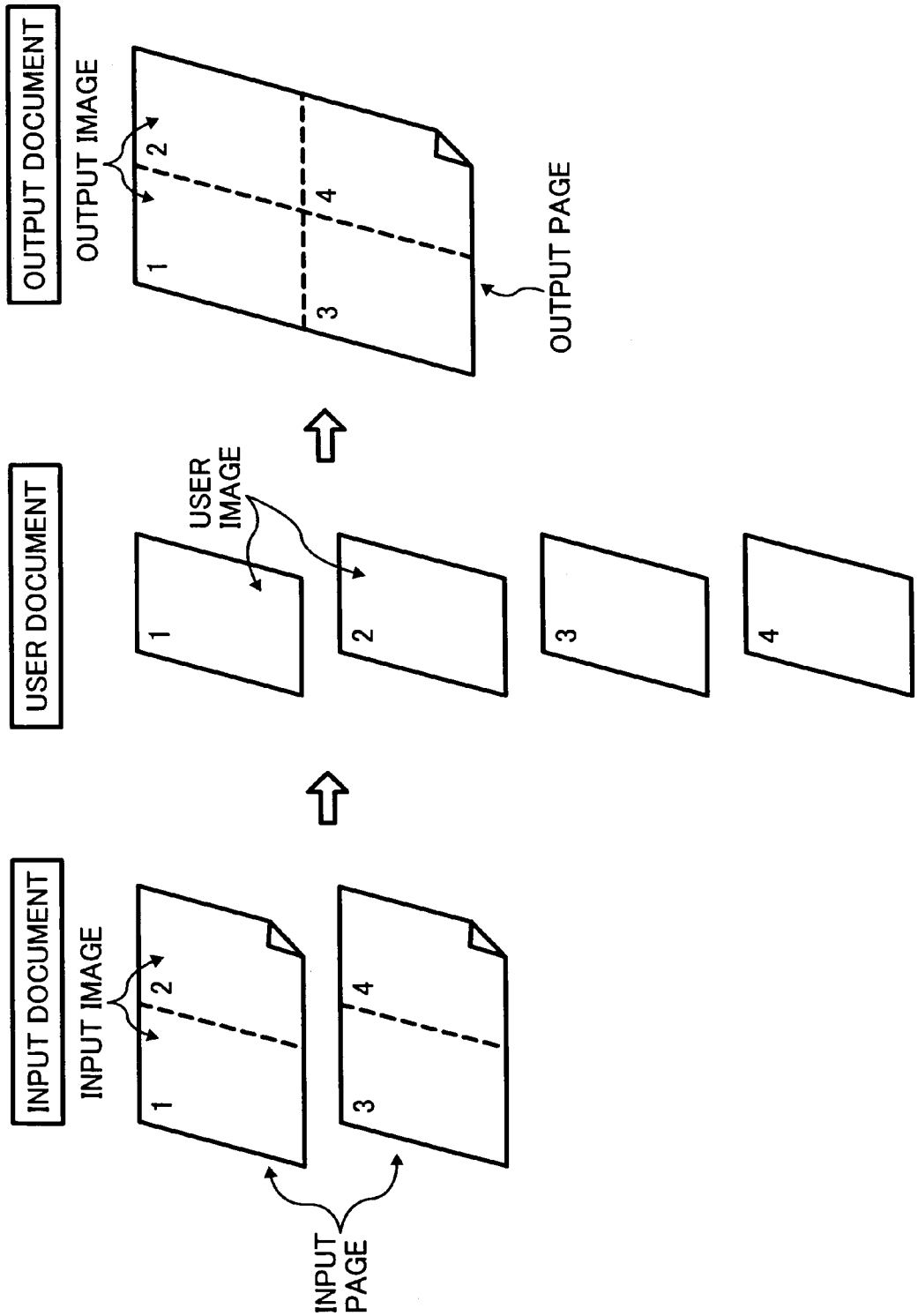

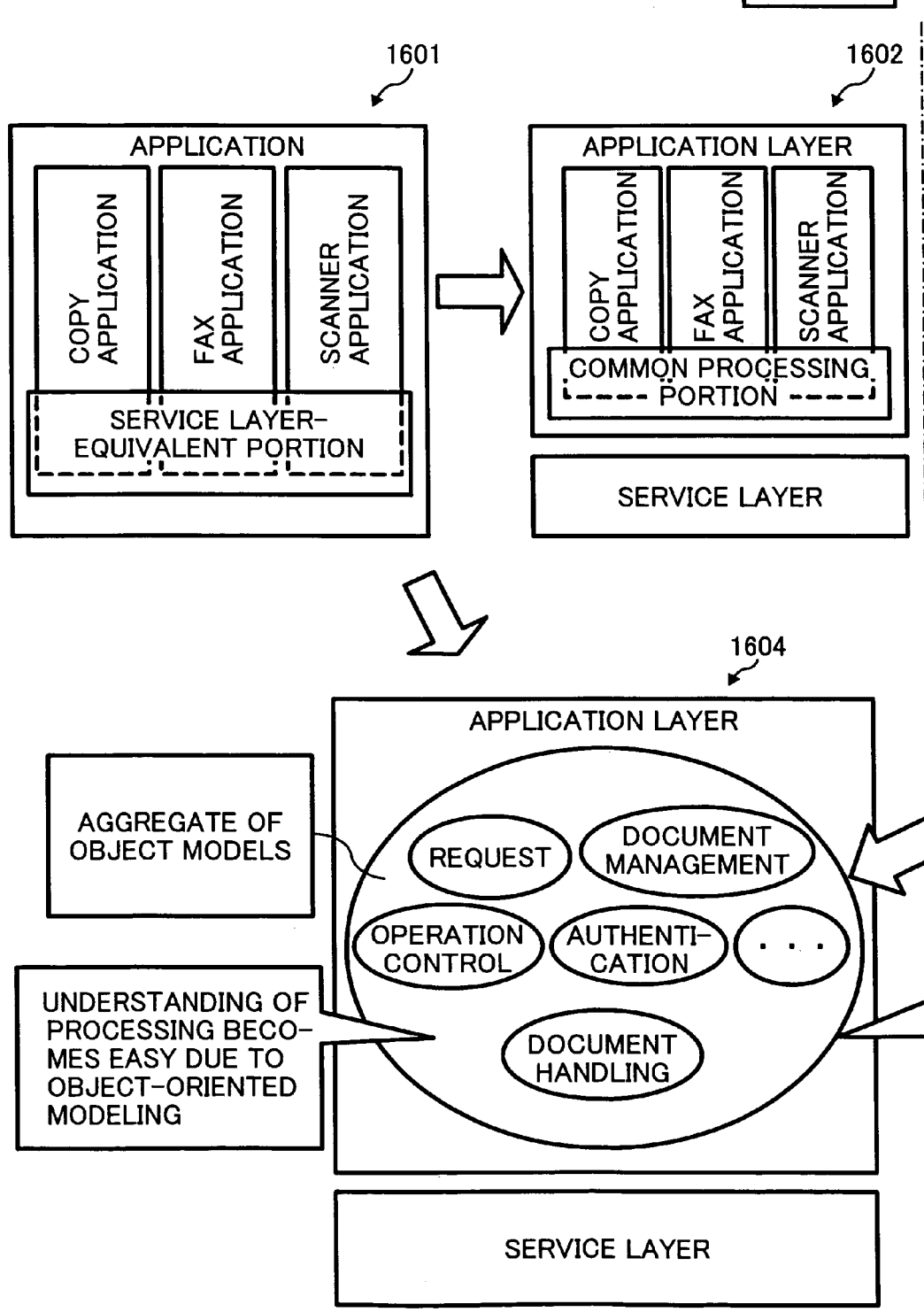

DOCUMENT PROCESSOR, IMAGE FORMING APPARATUS, DOCUMENT PROCESSING METHOD, AND COMPUTER PROGRAM

CROSS-REFERENCE TO RELATED APPLICATIONS

The present document incorporates by reference the entire contents of Japanese priority document, 2005-026762 filed in Japan on Feb. 2, 2005.

BACKGROUND OF THE INVENTION

1. Field of the Invention

The present invention relates to a document processor, an image forming apparatus, a document processing method, and a computer product, and more specifically relates to a technique used at the time of applying processing to a document input from any one of a plurality of input units.

2. Description of the Related Art

Conventionally, a multifunction product is well known, in which a plurality of functions of a printer, a copier, and a scanner is stored in one housing. In such a multifunction product, a plurality of applications referred to as a printer application, a copy application, and a scanner application is installed on a general-purpose operating system (OS) such as UNIX®, to realize a plurality of functions by switching execution processing of these applications.

However, in the printer application, the copy application, and the scanner application, since engine control, memory control, and system control are performed separately, overlapping processing occurs.

In Japanese Patent Application Laid-open (JP-A) No. 2002-084383, therefore, processing such as engine control, memory control, and system control performed respectively by the applications installed on the multifunction product is taken out from respective applications as a common processing part (platform), thereby attempting to improve the development efficiency of the application.

In JP-A No. H11-327883, print control software installed on a printer is formed of a plurality of software parts according to an object-oriented design, and print processing is performed by coordinated operation of the parts group.

However, in the invention disclosed in JP-A No. 2002-084383, the processing part that controls the hardware is made common, whereas the whole internal processing of the respective applications is not made common. Furthermore, since the internal processing is not made common and not divided into classes corresponding to the function, the development efficiency of the whole internal processing is not good. That is, in the applications on the multifunction product, to improve the development efficiency, there is still a room for improvement by making the internal processing common to all applications and dividing a characteristic function.

For example, when a user uses the multifunction product and outputs a document input from a plurality of input sources such as a FAX or a scanner from a printer, a local storage, or the FAX, since jobs included in each application such as copy and FAX realize the operation from input to output, processing is performed by a job different in each application. Hence, the processing with respect to the input document is not made common.

In the invention disclosed in JP-A No. H11-327883, the print control software is formed of a plurality of software parts according to the object-oriented design; however, software parts for controlling the flow of the processing in which the processing from input to output of the document is made common are not disclosed. Therefore, in a multifunction product having a plurality of input sources and output destinations according to a multifunctional design, even if a software part corresponding to the processing up to output of an input document is created by applying the invention disclosed in JP-A No. H11-327883, it is not easy to efficiently control the processing by making the processing over all applications common to all applications, since the user has heretofore performed processing of different jobs in each application corresponding to required processing.

Accordingly, it is an important issue as to how to realize efficiently common processing of a document by absorbing a difference of the input sources and the output destinations in the applications installed on the multifunction product. Such a problem does not occur only in the multifunction product. For example, the same problem occurs when there is a plurality of input units and a plurality of output destinations, and after processing such as "2 in 1" is performed with respect to a document input from one of the input units, the document is output from one of the output destinations.

SUMMARY OF THE INVENTION

It is an object of the present invention to at least solve the problems in the conventional technology.

According to an aspect of the present invention, a document processor having a plurality of input units and a plurality of output units, each input unit and each output unit corresponding to a specific function includes an input document unit capable of holding pieces of input document information converted to a predetermined common format regardless of the input units, after input processing is performed by the input units; a user document unit obtaining user images of a predetermined size to be processed, which are created based on the input document unit, and capable of holding the user images as pieces of user document information formed of the obtained user images; and an output document unit that reshapes the output image in a format to be output from at least one of the output units by using the output image created from the user images held in the user document unit to output the reshaped output image and can hold the output images as pieces of output document information to be output.

According to another aspect of the present invention, an image forming apparatus having a plurality of input units and a plurality of output units, each input unit and each output unit corresponding to a specific function includes an input document unit capable of holding pieces of input document information converted to a predetermined common format regardless of the input units, after input processing is performed by the input units; a user document unit obtaining user images of a predetermined size to be processed, which are created based on the input document unit, and capable of holding the user images as pieces of user document information formed of the obtained user images; and an output document unit that reshapes the output image in a format to be output from at least one of the output units by using the output image created from the user images held in the user document unit to output the reshaped output image and can hold the output images as pieces of output document information to be output.

According to still another aspect of the present invention, a document processing method includes converting input document information input from one or more of a plurality of input units to a common predetermined format regardless of the input units and managing the input document information; obtaining user images of a predetermined size to be processed from the input document information managed at the input document step and managing user document information formed of the obtained user images; and using an output image created from the user images constituting the user document information managed at the obtaining, to create output document information reshaped in a format to be output from at least one of a plurality of output units, and outputting the output document information.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is an explanatory diagram of a process for creating a "4 in 1" output document from a "2 in 1" input document by the document handling unit according to the embodiment;

DETAILED DESCRIPTION OF THE PREFERRED EMBODIMENTS

Exemplary embodiments of a document processor, an image forming apparatus, a document processing method, and a document processing program according to the present invention are explained below in detail with reference to the accompanying drawings. In embodiments of the present invention, an instance that the invention is applied to an image forming apparatus is explained. However, this invention is not limited thereto, and can be applied to various kinds of apparatuses that perform processing at the time of inputting and outputting documents from a plurality of input and output units.

First Embodiment

Figure 1:
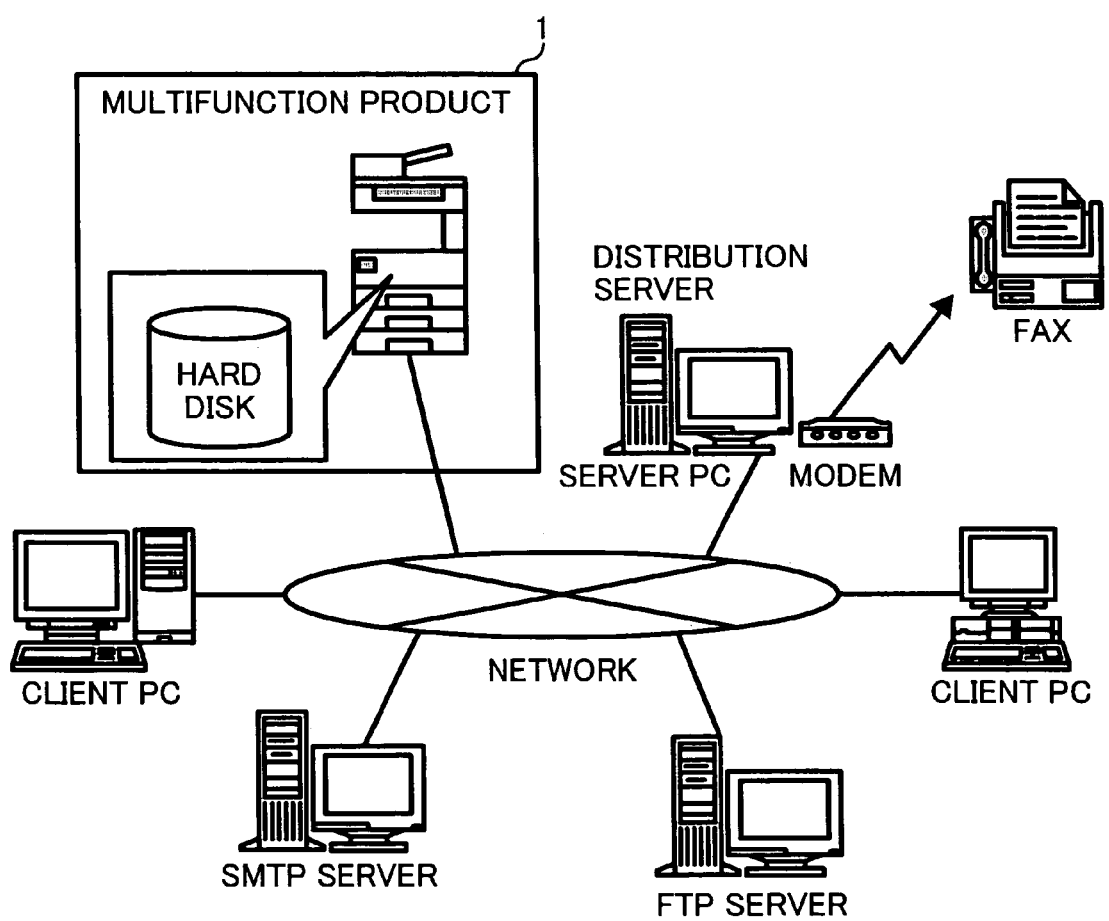
FIG. 1 is a network diagram for explaining a network environment surrounding a multifunction product according to an embodiment of the present invention.
Figure 2:
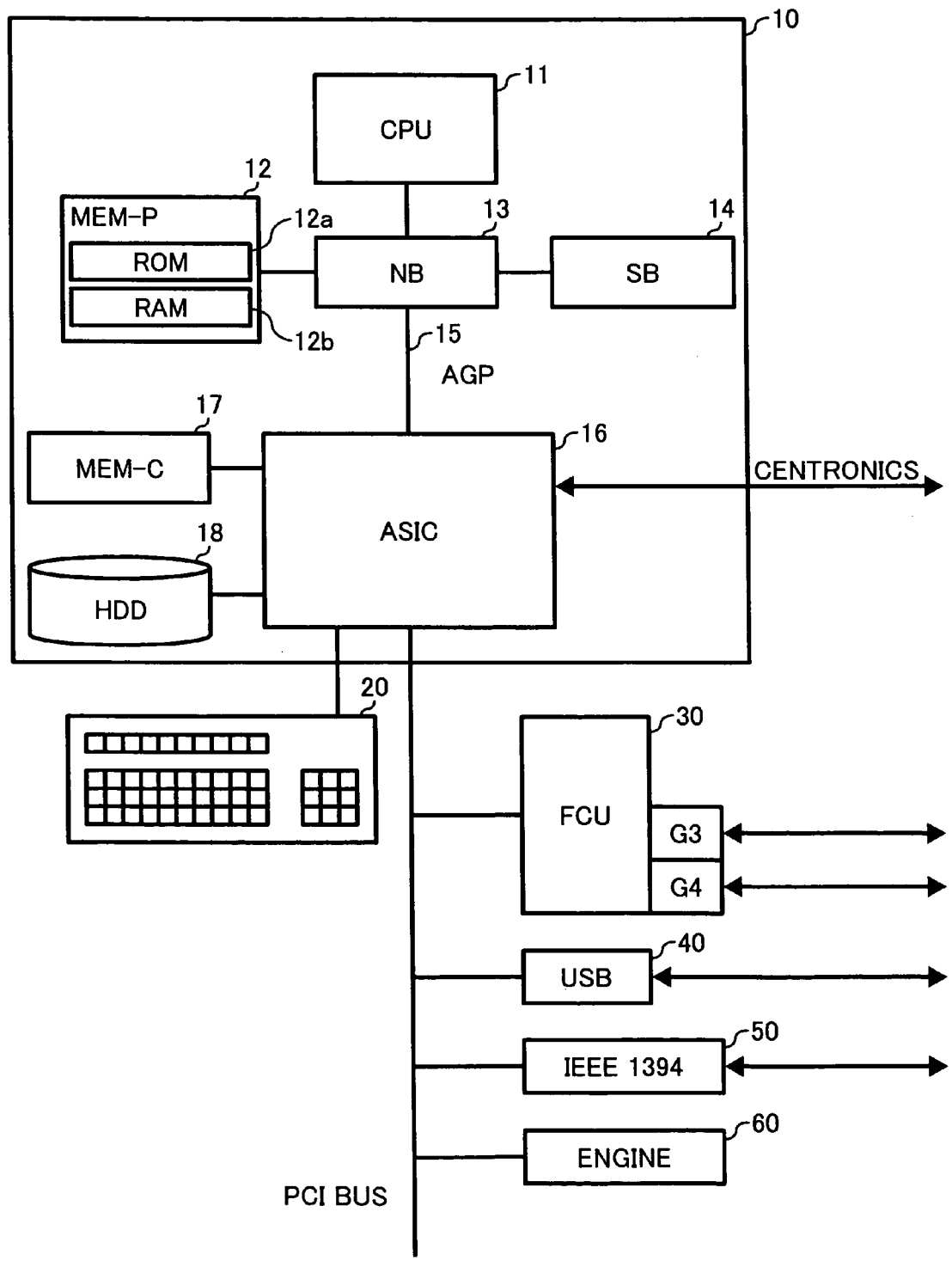
FIG. 2 is a block diagram of a hardware configuration of the multifunction product according to the embodiment.
Figure 3:
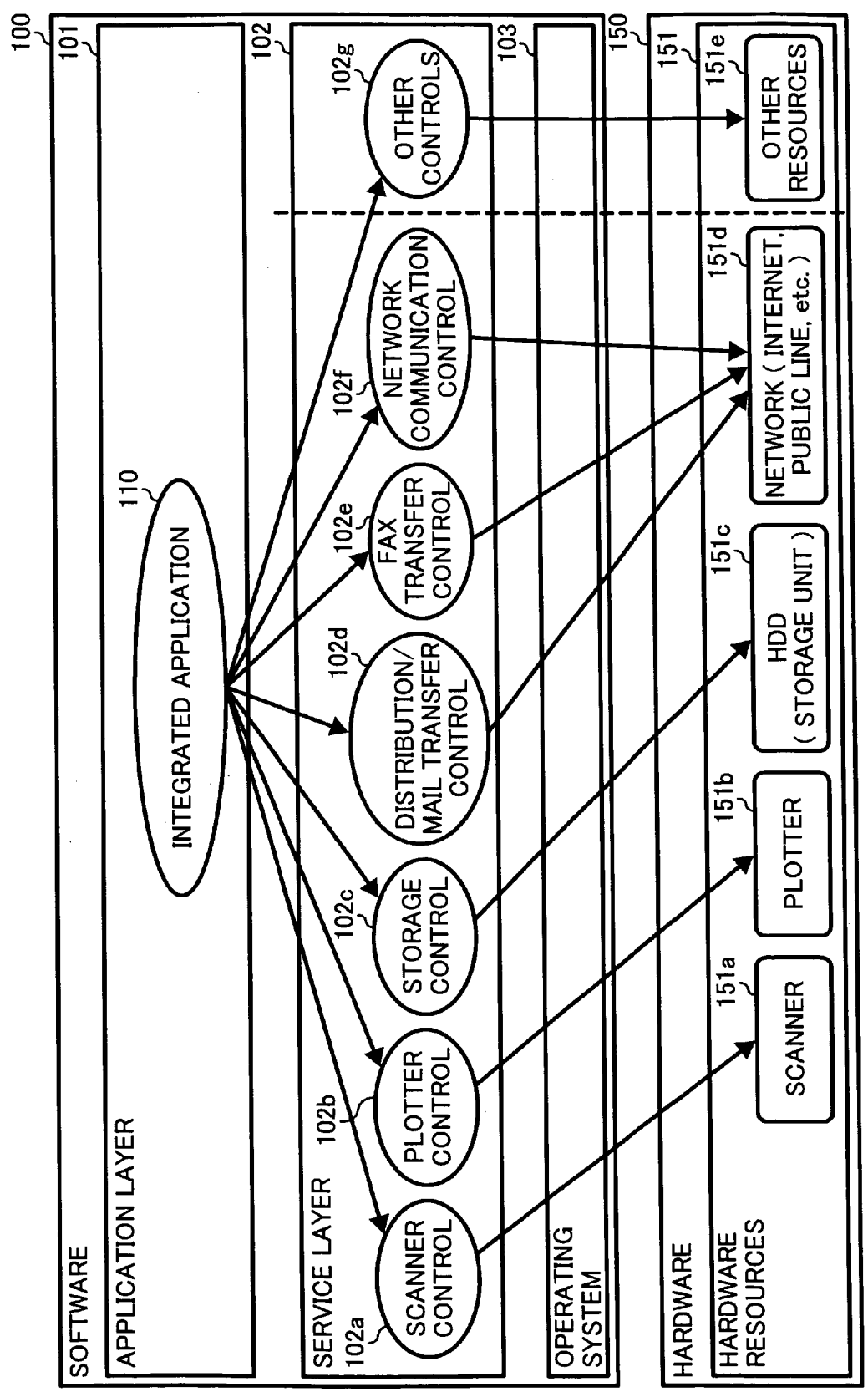
FIG. 3 is a conceptual diagram for explaining a relationship between software and hardware of the multifunction product according to the embodiment.
Figure 16B:
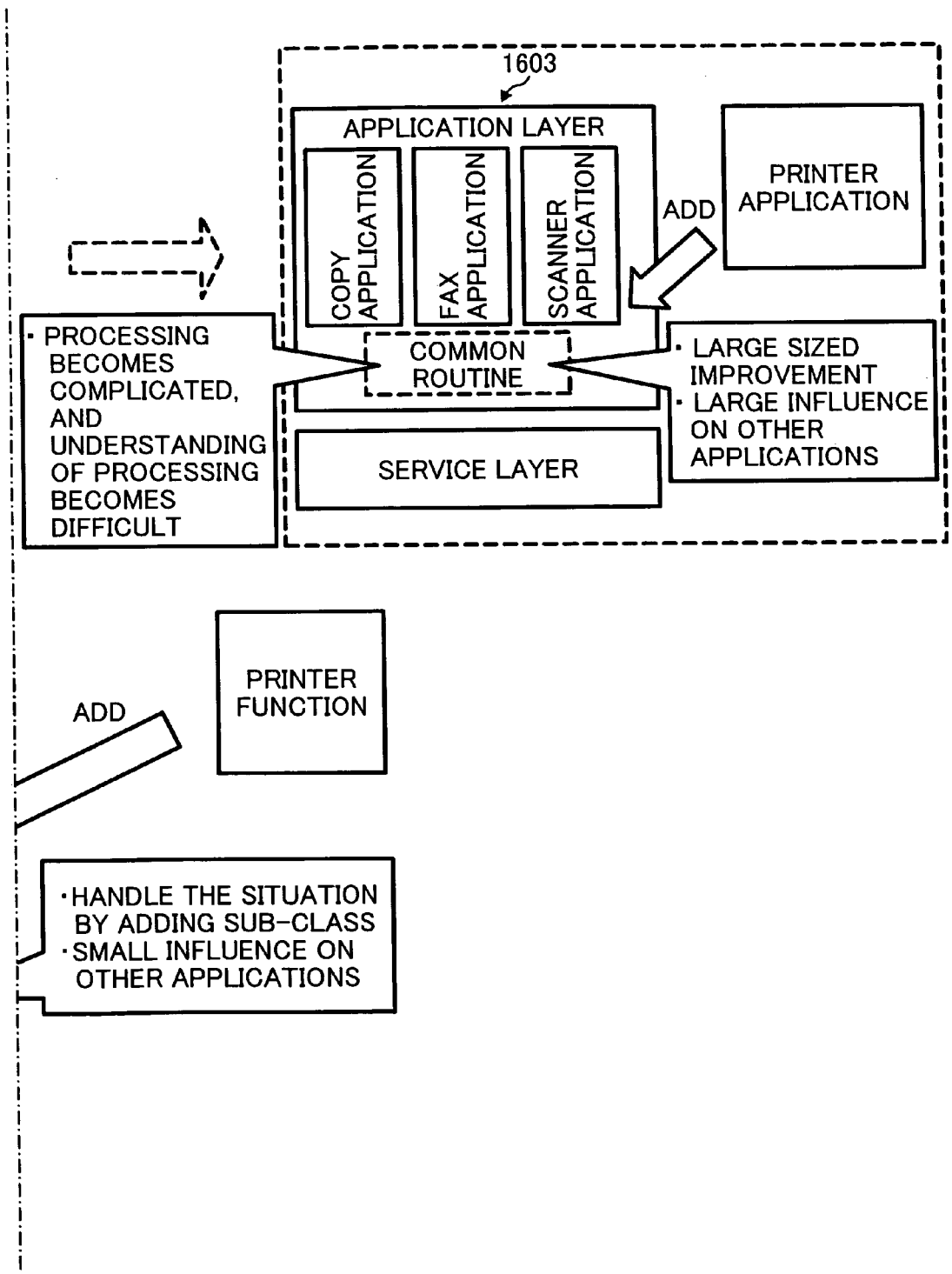
FIG. 16 is an explanatory diagram of transition in the software configuration installed in the multifunction product.
Figure 17:
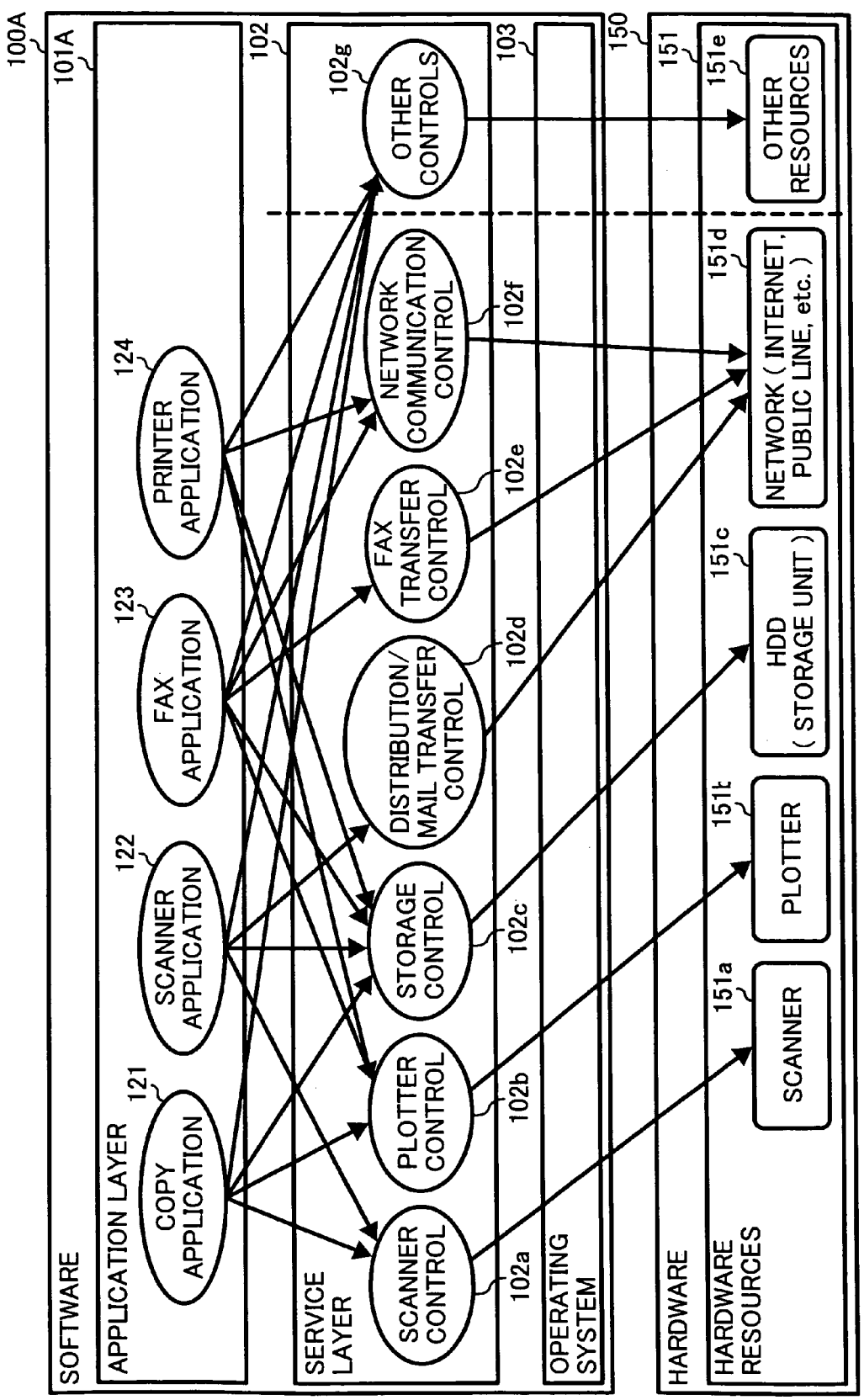
FIG. 17 is an explanatory diagram of a relationship between software and hardware in the conventional multifunction product.

The outline of an image forming apparatus (hereinafter, as "multifunction product") 1 according to a first embodiment of the present invention is explained with reference to FIGS. 1, 2, 3, 16, and 17. FIG. 1 is a network diagram for explaining a network environment surrounding the multifunction product 1 according to the first embodiment, FIG. 2 is a block diagram of a hardware configuration of the multifunction product 1 shown in FIG. 1, and FIG. 3 is a conceptual diagram for explaining a relationship between software and hardware of the multifunction product 1 shown in FIG. 1. FIG. 16 is an explanatory diagram of transition in the software configuration installed in the multifunction product. FIG. 17 is an explanatory diagram of a relationship between software and hardware in the conventional multifunction product.

As shown in FIG. 1, with a recent progress of network, it is quite common now that equipment such as a personal computer (PC) provided in an office is connected to a network such as a local area network (LAN) to communicate with each other. For example, as shown in FIG. 1, a client PC, a simple mail transfer protocol (SMTP) server, a file transfer protocol (FTP) server, a server PC, and the like are connected to the network, thereby enabling electronic document transfer and file transfer. A distribution server connected to the network by a modem can communicate with a FAX machine outside the office.

With the progress of the network, the multifunction product 1 is also connected to the network, thereby enabling two-way communication with the equipment such as the PC. By having a built-in storage unit such as a hard disk, the multifunction product 1 is advanced to a so-called network multifunction product, and can respond to various needs of users.

Specifically, the multifunction product 1 has, in addition to a normal copying machine, a printer function for printing document data and the like in response to a print request from the client PC, a FAX function for transmitting document data and the like to a FAX machine in other offices via a modem connected to the server PC in response to a FAX request from the client PC, and a storage function for storing the received FAX document and copied document in the built-in hard disk.

To realize these many functions, the software installed in the conventional multifunction product increases the size and becomes more complicated, thereby largely increasing the man-hour required for the development, maintenance, and management of the software. In the software installed in the multifunction product 1 according to the first embodiment, therefore, the man-hour required for the development, maintenance, and management of the software is reduced. The configuration of the software installed in the multifunction product 1 is explained later.

FIG. 2 is a block diagram of a hardware configuration of the multifunction product 1. As shown in FIG. 2, the multifunction product 1 has a configuration in which a controller 10 and an engine 60 are connected with each other by a peripheral component interconnect (PCI) bus. The controller 10 controls the whole multifunction product 1 and also controls drawing, communication, and input from an operation unit (not shown). The engine 60 is a printer engine or the like that can be connected to the PCI bus, such as a monochrome plotter, a one-drum color plotter, a four-drum color plotter, a scanner, or a FAX unit. The engine 60 includes image processing parts for error diffusion, gamma document data, and the like, in addition to the so-called engine part such as the plotter.

The controller includes a CPU 11, a north bridge (NB) 13, a system memory (MEM-P) 12, a south bridge (SB) 14, a local memory (MEM-C) 17, an application specific integrated circuit (ASIC) 16, and a hard disk (HDD) 18, where an accelerated graphics port (AGP) bus 15 connects between the north bridge (NB) 13 and the ASIC 16. The MEM-P 12 further includes a read only memory (ROM) 12a and a random access memory (RAM) 12b.

The CPU 11 controls the whole multifunction product 1, has a chip set including the NB 13, the MEM-P 12, and the SB 14, and is connected to other equipment via the chip set.

The NB 13 is a bridge for connecting the CPU 11 and the MEM-P 12, the SB 14 and the AGP 15, and includes a memory controller that controls read and write with respect to the MEM-P 12, a PCI master, and an AGP target.

The MEM-P 12 is a system memory used as a memory for storing programs and data, a memory for expanding programs or data, a drawing memory for the printer, and the like, and includes a ROM 12a and a RAM 12b. The ROM 12a is a read only memory used as a memory for storing programs and data, and the RAM 12b is a writable and readable memory used as a memory for expanding the programs and data, the drawing memory for the printer, and the like.

The SB 14 is a bridge for connecting the NB 13, a PCI device, and peripheral devices. The SB 14 is connected to the NB 13 via the PCI bus, and a network interface (I/F) and the like are connected to the PCI bus as well.

The ASIC 16 is an integrated circuit (IC) for the image processing including a hardware component for the image processing, and has a role as the bridge for respectively connecting the AGP 15, the PCI bus, the HDD 18, and the MEM-C 17. The ASIC 16 includes a PCI target and an AGP master, an arbiter (ARB) which is a core of the ASIC 16, a memory controller that controls the MEM-C 17, a plurality of direct memory access controllers (DMAC) that rotates the image data by a hardware logic or the like, and a PCI unit that transfers data between the engine 60 and the ASIC 16 via the PCI bus. A fax control unit (FCU) 30, a universal serial bus (USB) 40, the Institute of Electrical and Electronics Engineers (IEEE) 1394, and the interface 50 are connected to the ASIC 16 via the PCI bus.

The MEM-C 17 is a local memory used as an image buffer for copying and a code buffer, and the hard disk drive (HDD) 18 is a memory for accumulating the image data, the program, font data, and forms.

The AGP 15 is a bus interface for a graphics accelerator card proposed for speeding up the graphics processing, and by directly accessing the MEM-P 12 at a high throughput, the graphics accelerator can be made high speed.

FIG. 3 is a conceptual diagram of the configuration of the software and the hardware of the multifunction product 1. Specifically, FIG. 3 depicts a hierarchical relationship of the integrated application 110 including the document handling unit 212, which is a characteristic part of the first embodiment, software 100, and hardware 150. As shown in FIG. 3, the hardware 150 includes a hardware resources 151, and the hardware resources 151 includes a scanner 151a, a plotter 151b, a hard disk drive (HDD) 151c, a network 151d, and another resource 151e. The other resource 151e stands for hardware resources 151 other than the hardware resources 151a to 151d, and for example, is an input/output device such as an operation panel.

Figure 4:
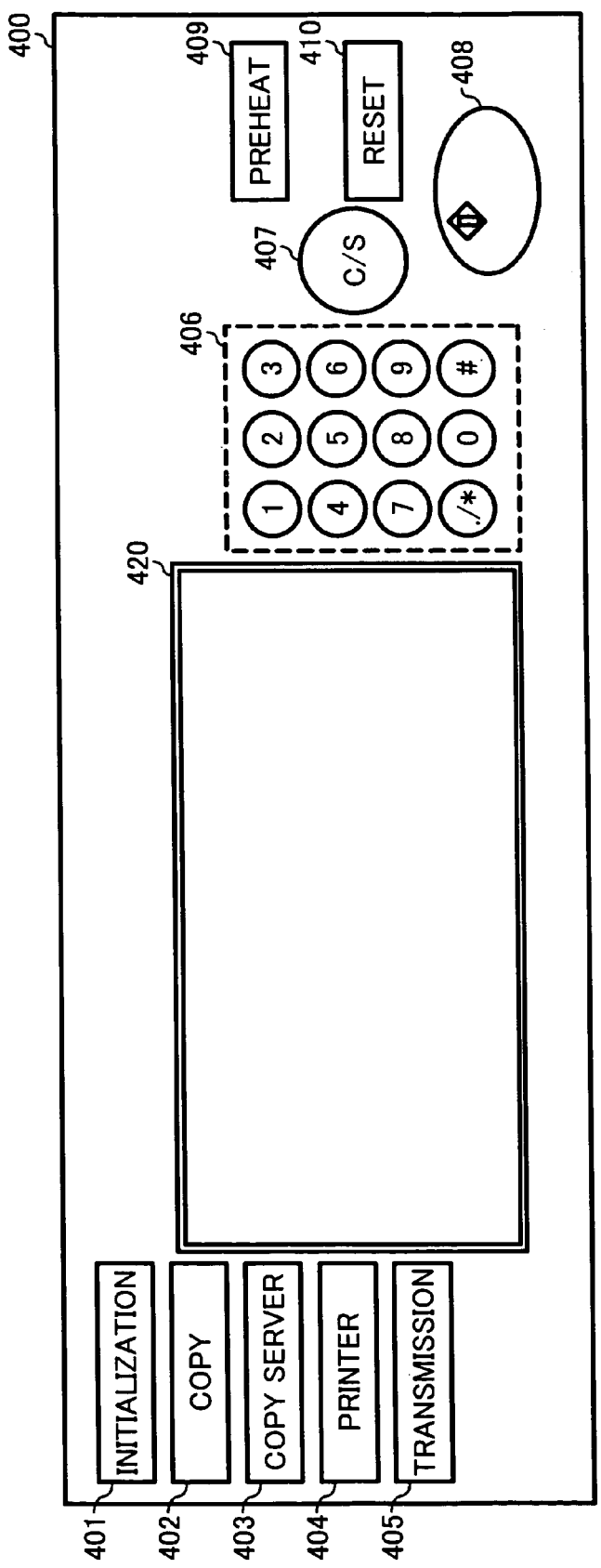
FIG. 4 is an example of an operation panel of the multifunction product according to the embodiment.

FIG. 4 is an example of an operation panel 400 of the multifunction product 1. As shown in FIG. 4, the operation panel 400 includes an initialization key 401, a copy key 402, a copy server key 403, a printer key 404, a transmission key 405, a ten key 406, a clear/stop key 407, a start key 408, a preheat key 409, a reset key 410, and a liquid crystal touch panel 420. When a user performs a predetermined operation using the operation panel 400 having such a configuration, objects substantiating the respective classes, which are the characteristic points of the first embodiment, included in the integrated application 110 operate.

For example, when the initialization key 401 is touched, an initialization menu is displayed on the liquid crystal touch panel 420, and paper sizes to be stored can be set in the menu. When copying operation is to be carried out, the copy key 402 is touched. When the copy result is to be stored in the multifunction product 1, the copy server key 403 is touched. When an operation relating to the printer is to be carried out, the printer key 404 is touched. When a fax or a stored image is to be transmitted, the transmission key 405 is touched. The menu corresponding to the touched key is then displayed on the liquid crystal touch panel 420.

Referring back to FIG. 3, the software 100 installed in the hardware 150 is hierarchized, a service layer 102 is constructed on the upper layer of the operating system 103, and an application layer 101 is constructed on the upper layer of the service layer 102. The service layer 102 includes a scanner controller 102a, a plotter controller 102b, an storage controller 102c, a distribution/mail transfer controller 102d, a Fax transfer controller 102e, a network communication controller 102f, and another controller 102g, corresponding to drivers that control the respective hardware resources (151a to 161e).

The background why the software 100 shown in FIG. 3 has such a hierarchical structure is explained here, with reference to FIGS. 16 and 17. FIG. 16 is an explanatory diagram of the transition of the software configuration installed in the multifunction product. As shown in an application 1601 before separating the service layer in FIG. 16, the software installed in the multi-functionalized multifunction product is created as an application independent for each function such as a copy application, a FAX application, and a scanner application, and operates on the operating system 103 shown in FIG. 3.

However, since these applications respectively include a driver (service layer 102) for controlling the hardware resources, there is overlapped processing in the respective applications. Accordingly, the size of the respective applications is large.

Therefore, as shown in an application 1602 after separating the service layer shown in FIG. 16, the portions corresponding to the service layer in the application 1601 before separating the service layer are tied up to form the service layer 102, and the respective applications are built in the application layer 101, which is the upper layer of the service layer 102. By having such a hierarchical structure, the respective applications are made slim, and manpower required for development is reduced.

However, it is found that there is a problem in that there is a common processing portion in the respective applications, as the multifunction product is connected via a network and multi-functionalization is further developed. Specifically, the respective application in the application layer 101, for example, the copy application and the scanner application have similar processing therein, such as processing for communicating with the driver such as the scanner controller 102a and the storage controller 102c, and stream control for controlling the flow of data handled by the respective functions. Thus, when the respective applications have similar processing, the development size of the respective applications increases, thereby increasing the improvement size of the respective applications with respect to a specification change of the service layer.

To solve this problem, as shown in a common routine-separating application 1603 in FIG. 16, it is considered to tie up the similar types of processing (common processing portions) as a common routine. However, since such a common routine is to make common various types of processing slightly different from each other in the respective applications, the processing in the common routine becomes complicated. Furthermore, for example, when a new application such as the printer application is to be added, an improvement in the common routine becomes necessary to be adapted for the new application.

However, since the internal processing of the common routine is complicated, it is difficult for repair personnel to understand the processing, thereby causing an increase in the improvement size and affecting other applications due to a repair error.

Accordingly, as shown in an object-oriented application 1604 in FIG. 16, a plurality of applications is integrated to an integrated application 110 by an object-oriented designing method (object modeling). Specifically, the common processing portion in the respective applications is extracted as an object model, and the integrated application 110 is formed of an aggregate of the object models. The conventional functions such as the copy function and the scanner function are realized by the cooperative relationships of the object models.

By having such a configuration, addition of the new function, for example, the printer function can be handled by sub-classification of a class belonging to such an object model. Therefore, the portion to be improved is clarified, thereby decreasing the influence of the improvement on other functions. Furthermore, in a program by the object modeling, the processing can be understood more easily than in the conventional procedural program. Therefore, the improvement personnel can understand the processing easily, thereby contributing to a reduction of the improvement size and a reduction of an influence of an improvement error oh other applications.

FIG. 17 is an explanatory diagram of the configuration of the conventional application at the step of the application 1602 after separating the service layer in FIG. 16, and a relationship between the application and the respective drivers in the service layer 102. As shown in FIG. 16, an application layer 101A includes a copy application 121, a scanner application 122, a FAX application 123, and a printer application 124.

For example, the copy application transfers data with the scanner controller 102a, the plotter controller 102b, the storage controller 102c, and the other controller 102g to realize the copy function. The FAX application 123 transfers data with the plotter controller 102b, the storage controller 102c, the FAX transfer controller 102e, the network communication controller 102f, and the other controller 102g to realize the FAX function. Thus, the communication between the respective applications in the application layer 101A and the respective drivers in the service layer 102 is complicated.

Referring back to FIG. 3, the applications present in the application layer 101 is integrated to the integrated application 110 by the object modeling. The communication processing with the respective drivers performed respectively by the respective applications is performed by a predetermined object model constituting the integrated application 110. Therefore, the communication between the applications in the application layer 101 and the respective drivers in the service layer 102 is simplified as compared to the communication shown in FIG. 17.

Figure 5:
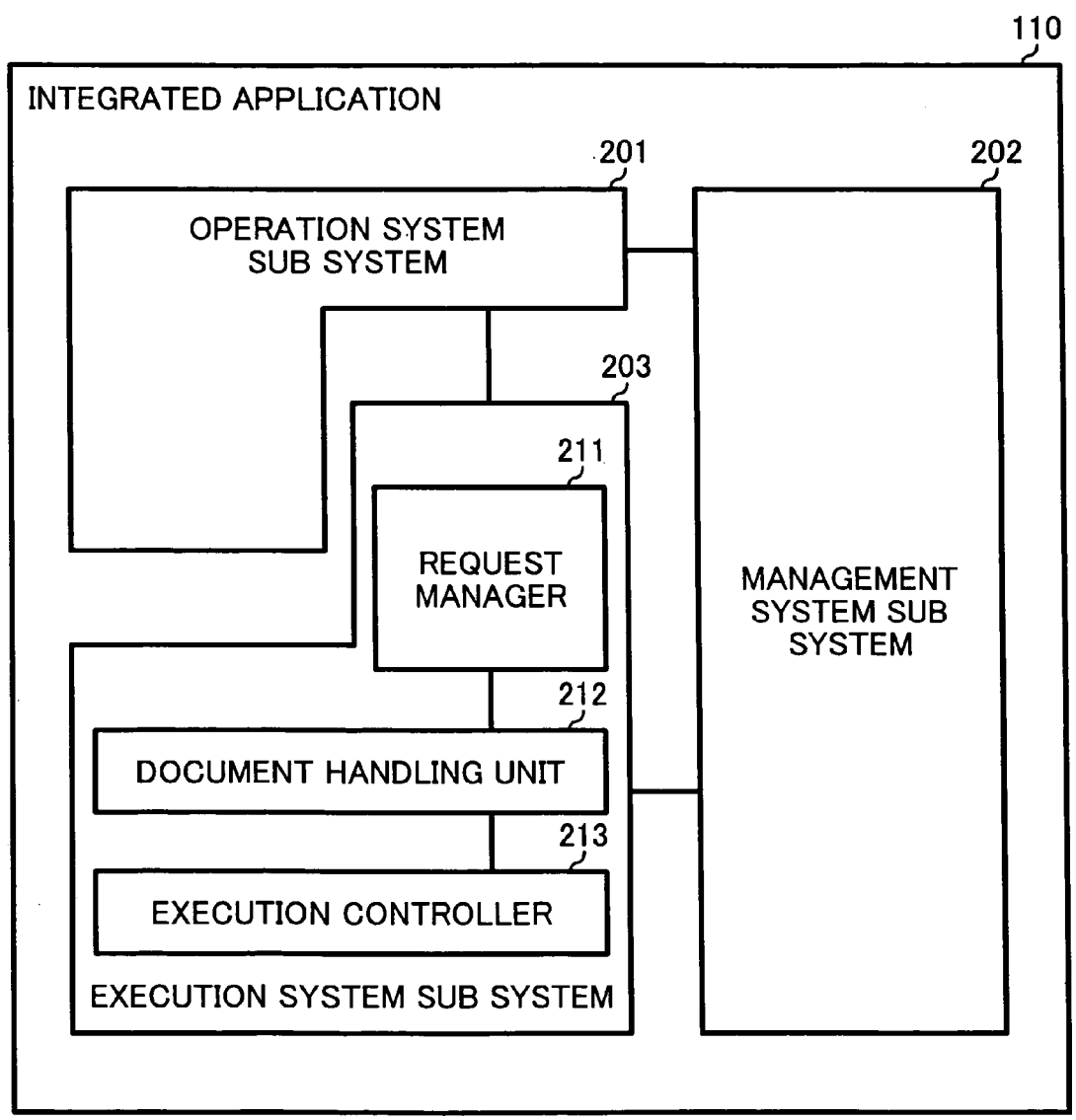
FIG. 5 is an explanatory diagram of an inner configuration of an integrated application and a position of a document handling unit in the integrated application of the multifunction product according to the embodiment.

The inner configuration of the integrated application is explained next. FIG. 5 is an explanatory diagram of the inner configuration of the integrated application 110 and the position of the document handling unit 212, which is the characteristic part of the first embodiment in the integrated application 110. As shown in FIG. 5, the integrated application 110 includes an operation system sub system 201, a management system sub system 202, and an execution system sub system 203.

The operation system sub system 201 is a software group in charge of a man-machine interface. Specifically, the operation system sub system 201 performs processing for receiving a request from a user, processing for instructing execution of the request, and processing for providing information of the execution situation of the request and the execution result.

The management system sub system 202 is a software group that manages resources of the multifunction product 1. Specifically, the management system sub system 22 offers service of managing the hardware resources 151 and the data condition held by the hardware resources 151.

The execution system sub system 203 is a software group in charge of execution of the request from the user. For example, when a copy request is made, the execution system sub system 203 performs processing from reading the document to output of the result.

The operation system sub system 201, the management system sub system 202, and the execution system sub system 203 request processing to each other according to need, and transmit the result. Thus, the respective sub systems cooperate with each other, to offer services required for the multifunction product 1 as the entire integrated application 110.

The execution system sub system 203 includes the document handling unit 212, which is the characteristic part of the first embodiment, a request manager 211, and an execution controller 213. The document handling unit 212 receives a request to process the document data from the request manager 211, requests to the execution controller 213 read control of the scanner 151a, read control from a local storage such as the HDD 151c, or output control to the plotter 151d, the local storage, and the like, and performs common processing of the document data, regardless of an input source and an output destination.

Figure 6:
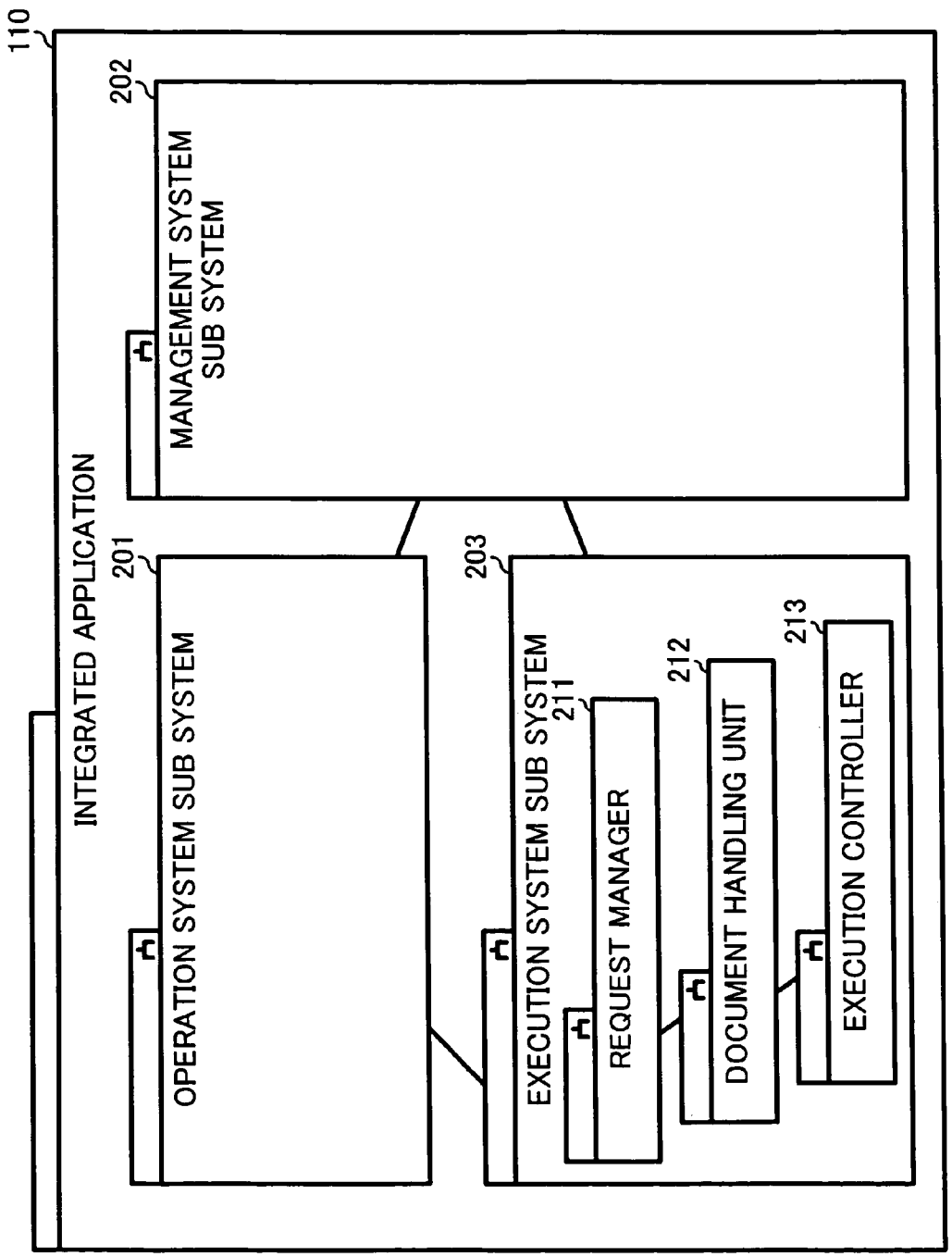
FIG. 6 is a UML class diagram for respective sub systems shown as the inner configuration of the integrated application of the multifunction product according to the embodiment.

FIG. 6 depicts a case that the respective sub systems shown in FIG. 5 are replaced by a class diagram (UML class diagram) of a unified modeling language (UML). The UML is a system modeling language whose specification is planned by an object management group (OMG), and defines notation for describing the result of modeling. The UML is widely used in object-oriented designing of the software.

As shown in FIG. 6, the integrated application 110 includes a plurality of packages, and the integrated application 110 itself is one package. The package is obtained by grouping the respective components (symbols) of the UML model, and the package is expressed by a folder-type symbol with a tab at the upper left. A line connecting the respective packages indicates that there is a relationship such as processing request between respective packages.

As shown in FIG. 6, the integrated application 110 includes three packages, that is, the operation system sub system 210, the management system sub system 202, and the execution system sub system 203 therein. The execution system sub system 203 includes packages of the request manager 211, the document handling unit 212, and the execution controller 213 therein. Lines connecting the operation system sub system 210, the management system sub system 202, and the execution system sub system 203 indicate that there is a relationship such as message transfer between respective packages. Signs put at the right end of the tab of the operation system sub system 210, the management system sub system 202, and the execution system sub system 203 are UML symbols indicating that these packages are sub systems.

The document handling unit 212, which is the characteristic part of the first embodiment, is explained in detail. The document handling unit 212 performs processing upon reception of a request to process the document data from the request manager 211. When the document handling unit 212 is designed based on the object orientation, the existing processing is not simply objectified; however, the object model is constructed so that addition and improvement of functions can be performed more easily. The background for deriving such configuration of the object model is explained.

Figure 14:
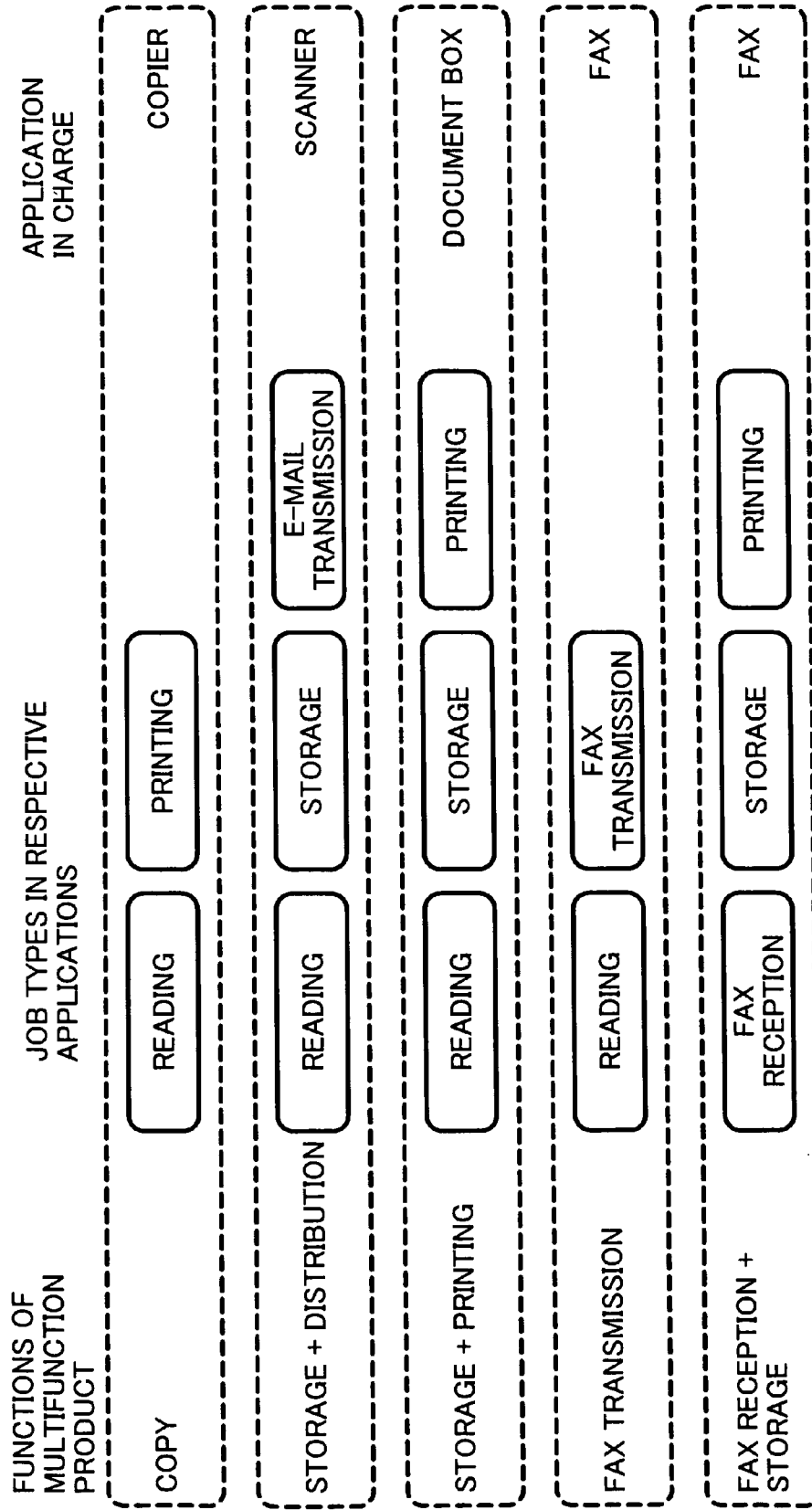
FIG. 14 is an explanatory diagram of job types included in each application in a conventional multifunction product.

Conventionally, in the multifunction product, respective applications such as the copy application 121 equipped in the application layer 101 shown in FIG. 17 have performed the processing. FIG. 14 is an explanatory diagram of job types included in each application in the conventional multifunction product. As shown in this figure, the corresponding application executes jobs such as "read", "FAX reception", "printing", "storage", or "FAX transmission" as required at the time of input, to realize the functions of the multifunction product. In this case, the respective applications need to include the jobs such as "read". That is, when the input source or the output destination increases as the function of the multifunction product, it is necessary to extend the function for each application. Therefore, the processing is made common; however, as to which class configuration needs to be created to share the input/output and processing becomes a problem.

Figure 15:
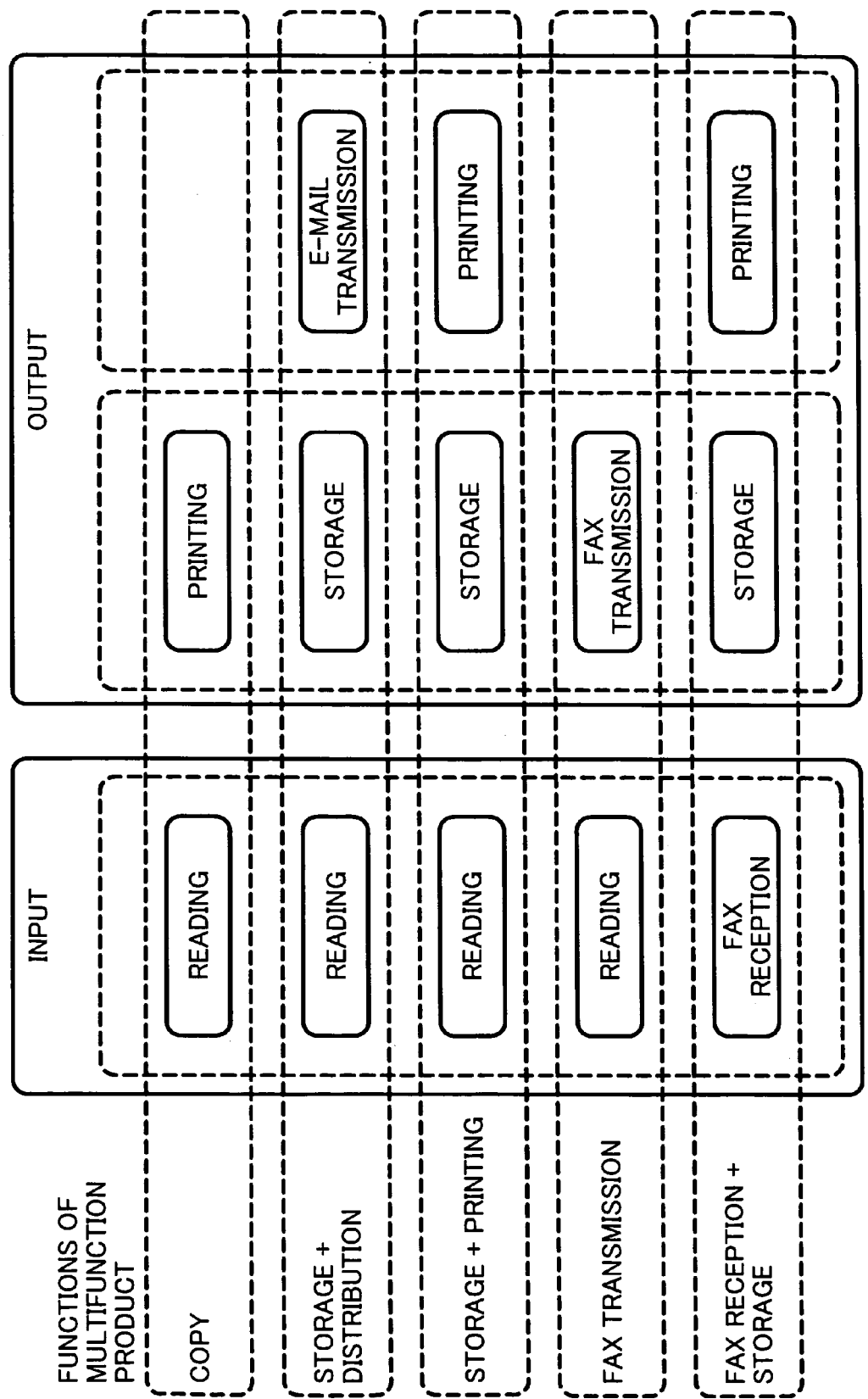
FIG. 15 is an explanatory diagram in which jobs provided in each application in a conventional multifunction product are classified by input and output.

FIG. 15 is an explanatory diagram in which jobs provided in each application in the conventional multifunction product are classified by input and output. It can be confirmed that even when the functions executed in each application are different, jobs used for the input or the output are common. Therefore, the concept that the application is provided for each function is eliminated, to make the processing common, thereby constituting an object model in which only an input source and an output destination are selected.

Figure 7:
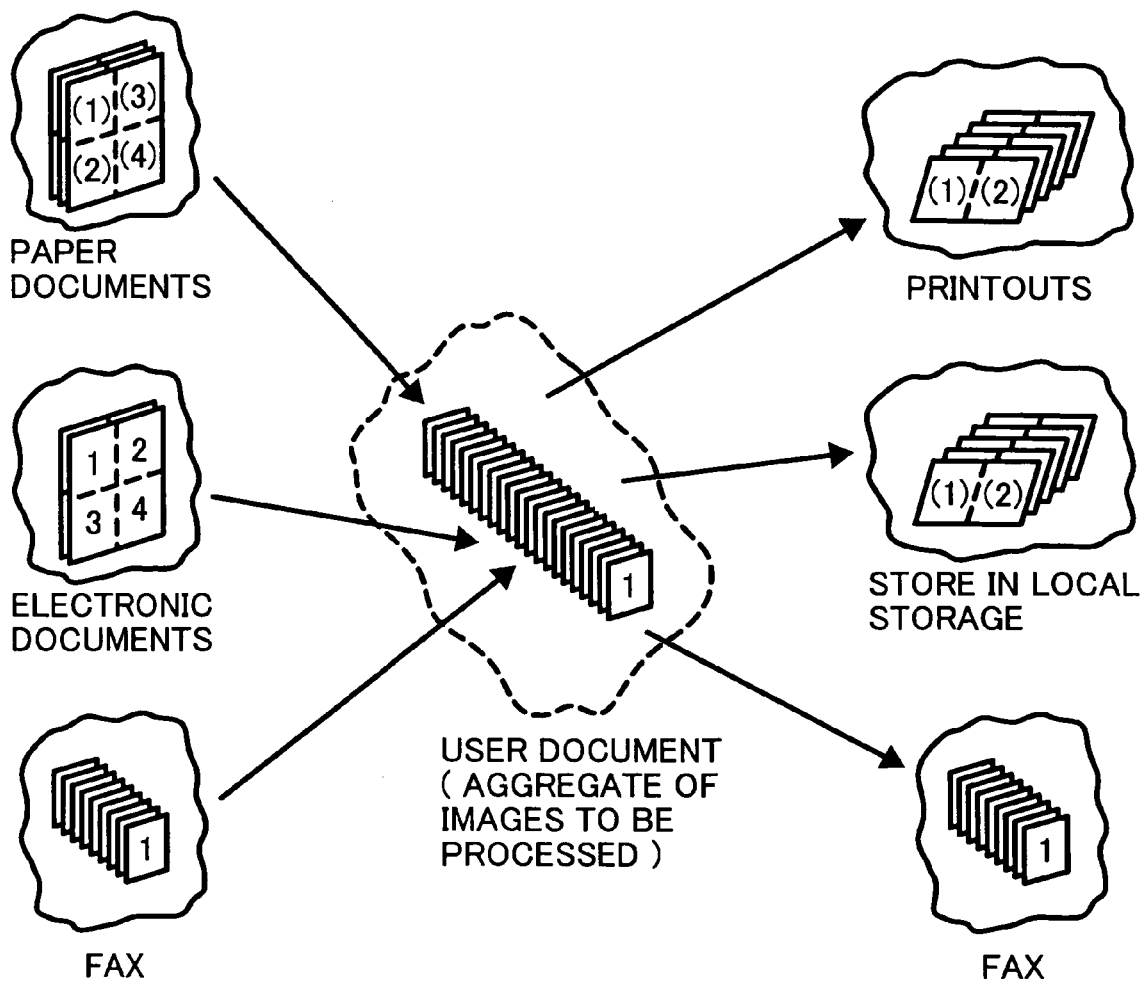
FIG. 7 is a conceptual diagram of processing performed by the document handling unit included in the multifunction product according to the embodiment.

FIG. 7 is a conceptual diagram of processing performed by the document handling unit 212, which is the characteristic part of the first embodiment. As shown in FIG. 7, the document handling unit 212 obtains an image to be processed, which has been divided to a predetermined size that can be formed as a page, from the input document data (hereinafter, "input document"), regardless of the input source of the input document data being paper document, electronic document, or FAX-received document, to create document data formed of the image to be processed (hereinafter, "user document"). The document handling unit 212 then creates document data obtained by shaping the created document data according to the output destination (hereinafter, "output document"), to output the created document data, for example, by printing, storing, or FAX transmission. According to this configuration, when the input source and the output destination are modified or added, it is not necessary to modify the program for each of the provided applications, thereby facilitating the program development.

Furthermore, to perform processing in common regardless of the input source or the output destination, a format is prepared in advance, and an input document or an output document is applied to this format and managed, thereby enabling management of the document regardless of the input source or the output destination, and further enabling easy processing.

Figure 8:
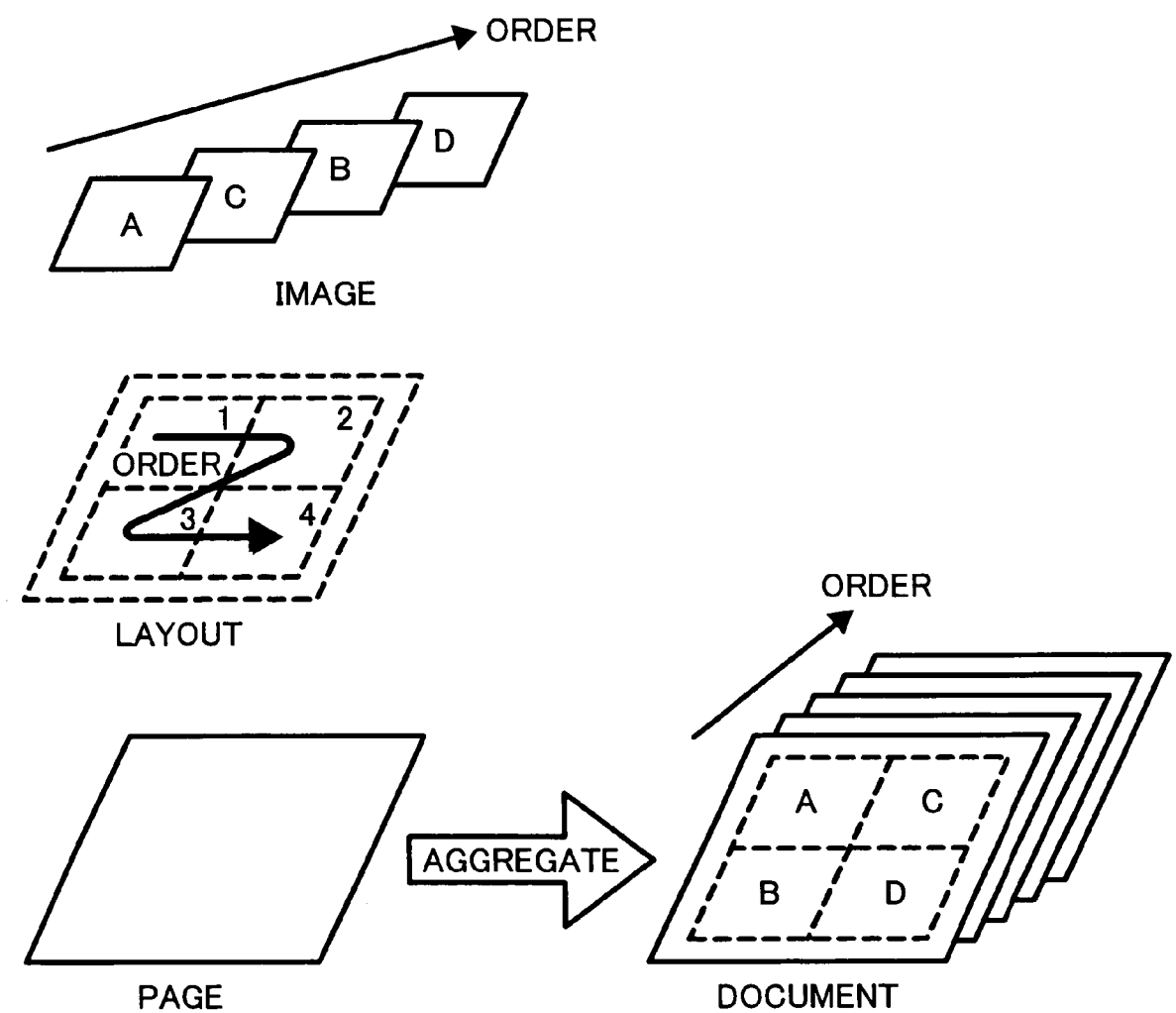
FIG. 8 is a conceptual diagram of a configuration for managing input documents and output documents in the embodiment.

FIG. 8 is a conceptual diagram of the configuration for managing input documents and output documents in the first embodiment. As shown in FIG. 8, the input documents and the output document are divided into pages and managed. The respective pages are formed of an image and a layout determining the arrangement of the image. That is, images divided into the predetermined size that can be formed as a page are sequentially fitted to each page according to the predetermined layout, thereby obtaining the input document or the output document.

According to this configuration, document data can be managed in a common format regardless of the input source or the output destination, and processing such as "2 in 1" can be easily performed.

Figure 9:
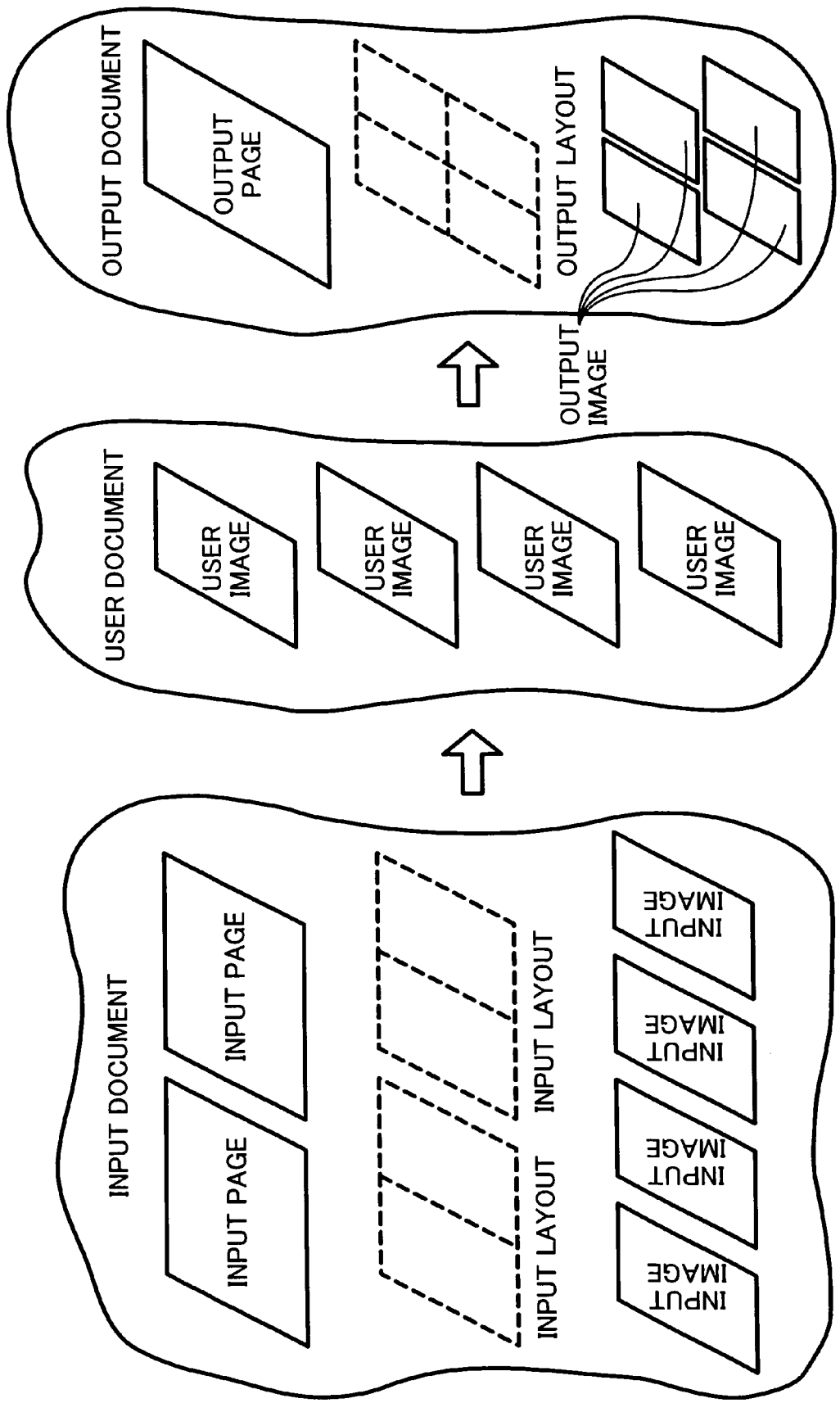
FIG. 9 is an explanatory diagram of a change in the configuration from the input document, a user document, up to the output document used in document processing according to the embodiment.

In other words, images (hereinafter, "input images") divided according to the layout (hereinafter, "input layout") for each page (hereinafter, "input page") are created from an input document input from an input source. At the time of processing, images to be processed (hereinafter, "user images") are created from the input images, to create a user document having these user images. At the time of output, output images are created from the user images included in the user document, and the created output images are fitted to each page according to the output layout corresponding to the output destination, to create an output document. FIG. 9 is an explanatory diagram of a change in the configuration of from the input document, the user document, up to the output document used in the document processing according to the first embodiment. The input document is managed as a combination of the input pages, the input layouts, and the input images regardless of the input source, and at the time of processing, the input document is managed as a user document having only the user images created from the input images. The user document includes user images that are divided into a predetermined size. Accordingly, when the document is output as an output document, the output images created from the user images according to the output layout can be flexibly arranged according to the request of the user. When the output images are created from the user images, processing such as scaling is performed so as to fit the images to the output layout.

The document handling unit 212 includes an "input document class", a "user document class", and an "output document class" based on the object modeling. According to the configuration shown in FIG. 8, the "input document class" holds an "input page class", and the "output document class" holds an "output page class". Furthermore, the "input page class" holds an "input layout class" and an "input image class", and the "output page class" holds an "output layout class" and an "output image class". The "user document class" holds "user images".

Sub-classes are provided for each input source in the "input document class", and sub-classes are also provided for each output destination in the "output document class". In the first embodiment, it is assumed that the input source includes a "paper" document read by the scanner, a "net" document input via the network, and an "LS" document stored in the local storage such as the hard disk. An "input net document class", an "input paper document class", and an "input LS document class" are provided as the sub-classes of the "input document class". Likewise, it is assumed that the output destination includes "paper", "net", and "LS", and an "output net document class", an "output paper document class", and an "output LS document class" are provided as the sub-classes of the "output document class".

When having received a request to process document data from the request manager 211, the document handling unit 12 designed according to the object modeling performs processing from inputting the input document (for example, paper document, electronic document, Fax-received document, and the like) to outputting the output document (for example, for example, paper document, electronic document, or Fax-received document). After these types of processing, the document is output from the hardware resources 151 under the control by the service layer 102 from the execution system sub system 203.

Figure 10A:
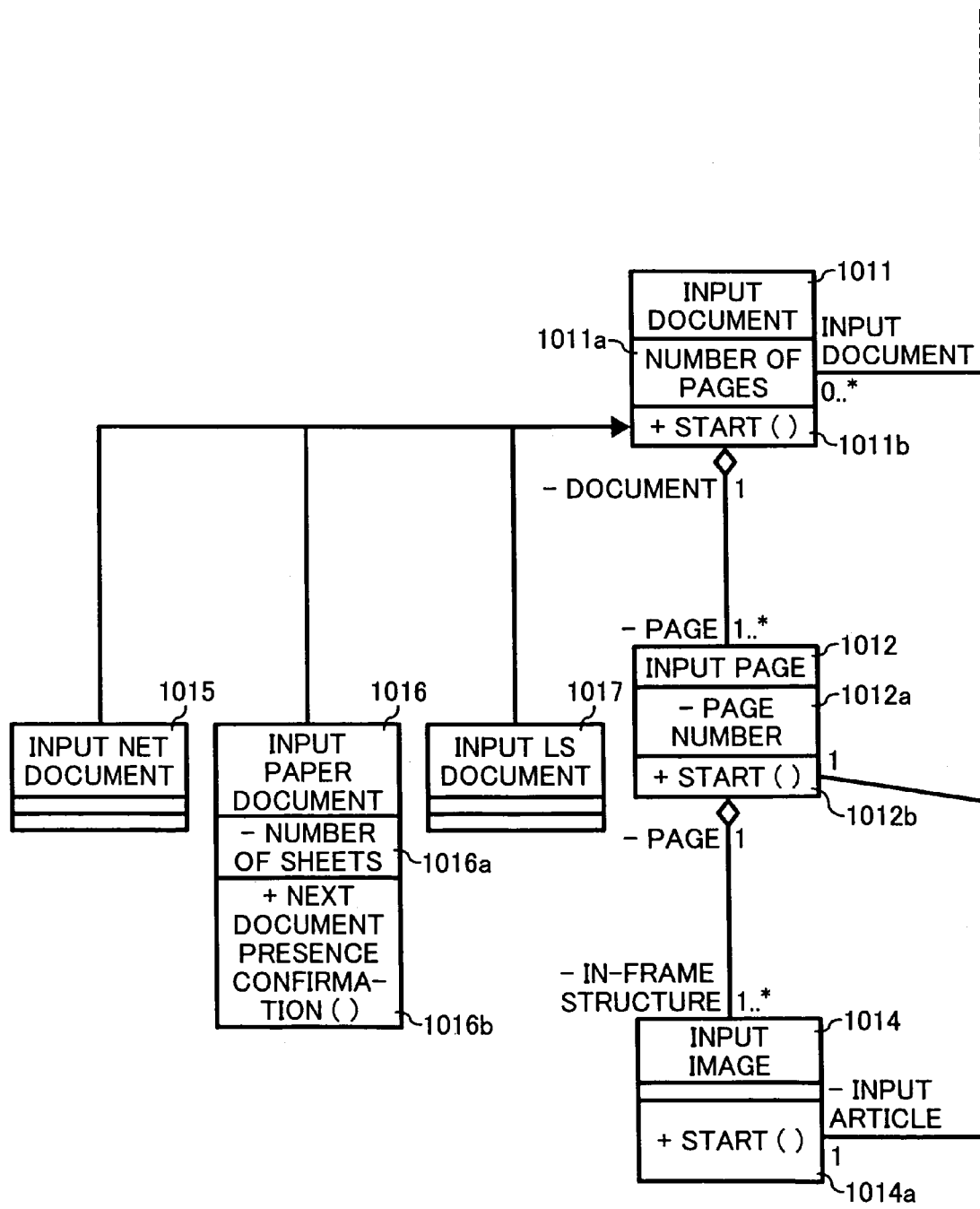
FIG. 10 depicts a class configuration of the document handling unit designed according to an object modeling by a UML class.
Figure 10B:
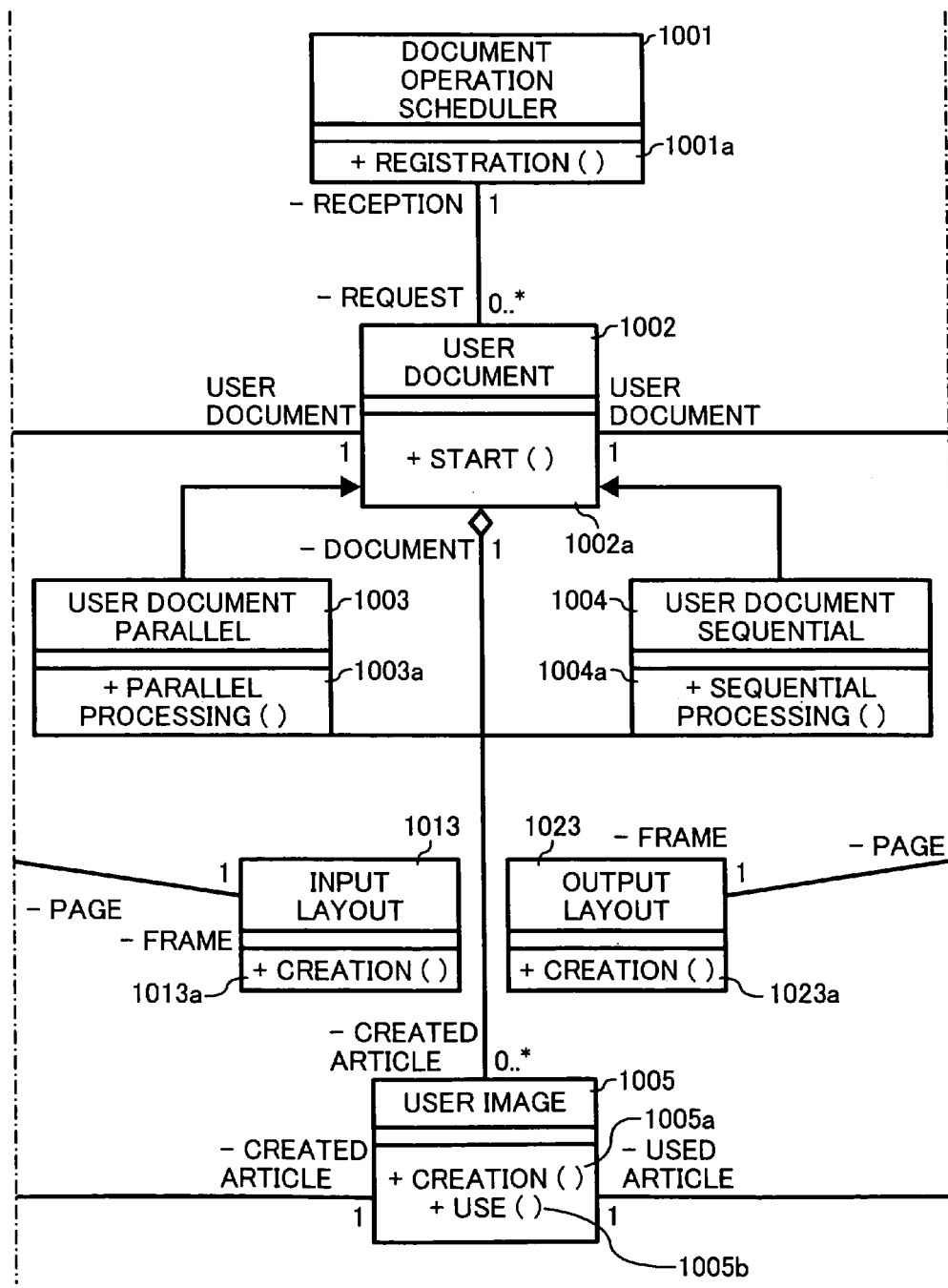
Figure 10C:
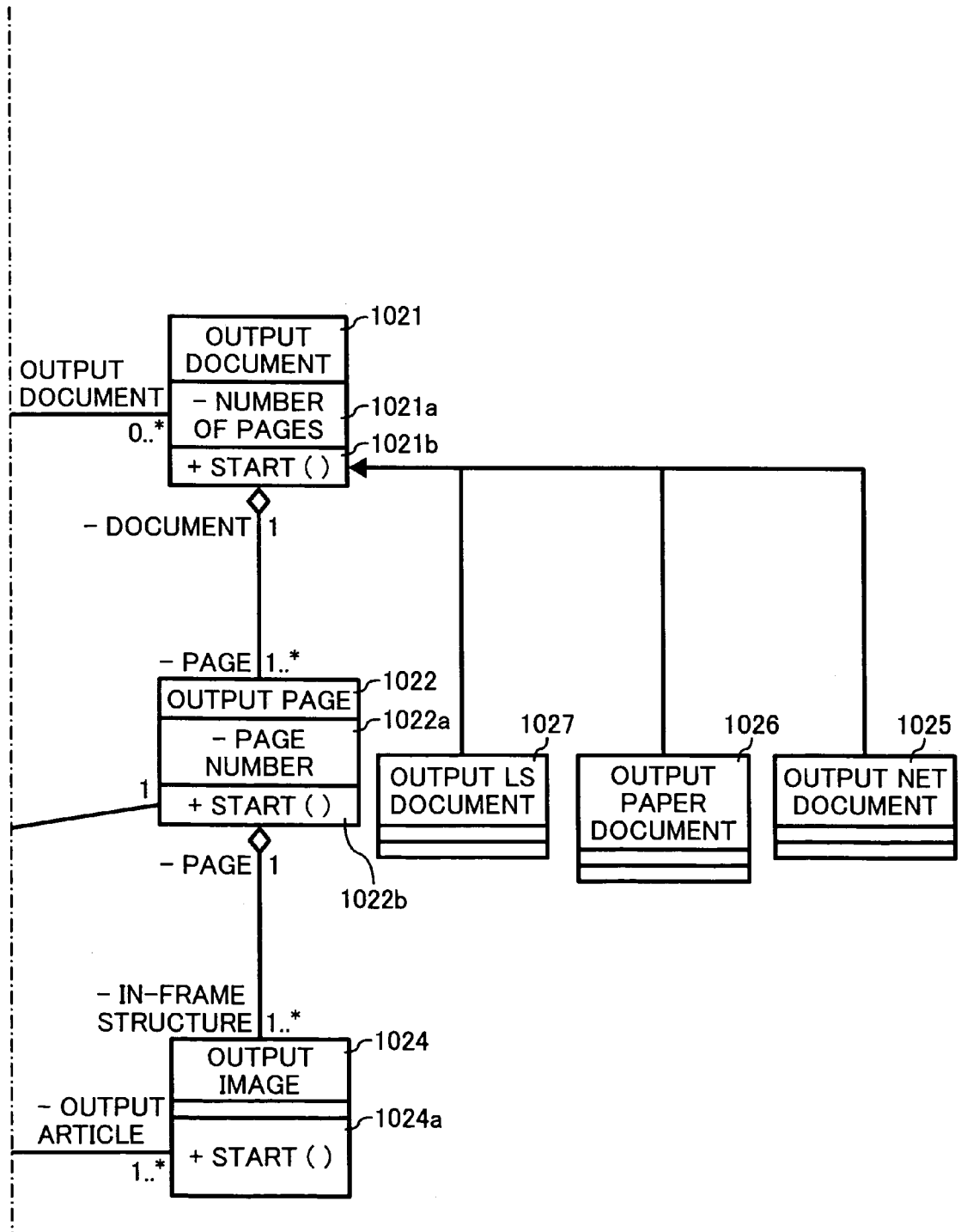

FIG. 10 depicts the class configuration of the document handling unit 212 designed according to the object modeling by the UML class. As shown in FIG. 10, the document handling unit 212 includes a document operation scheduler class 1001, an input document class 1011, an input page class 1012, an input layout class 1013, an input image class 1014, an input net document class 1015, an input paper document class 1016, an input LS document class 1017, a user document class 1002, a user document parallel class 1003, a user document sequential class 1004, a user image class 1005, an output document class 1021, an output page class 1022, an output layout class 1023, an output image class 1024, an output net document class 1025, an output paper document class 1026, and an output LS document class 1027. According to the configuration, the commonly document processing can be performed regardless of the input source or the output destination.

Rectangles indicating the respective classes have three sections, which are referred to as, from the top, a name section indicating a class name, an attribute section indicating data (attribute) of the class, and an operation section indicating processing (operation) of the class. For example, the rectangular name section indicating the input document class 1011 indicates that the class name of the class is "input document", and the attribute section indicates that the attribute of the class is "number of pages", and the operation section indicates that the operation of the class is "start( )".

Thus, the respective classes have the attribute section for holding the data (attributes), and the operation section for holding the processing (operation) to perform write and read of the attributes. Since these classes are included as a part of the program (integrated application 110), when the program stored in the ROM 12a beforehand is executed, the respective classes are substantiated in a predetermined area in the RAM 12b, and the respective data (attributes) included in the attribute section are expanded on the RAM 12b. Therefore, the object substantiating the class can write and read the data (attributes) on the RAM 12b.

When "−" sign is added to the left of the class element such as the attribute and the operation, the sign indicates that the element is not open to the external classes, and "+" sign indicates that the element is open to the external classes. For the operation, it is normal to add "( )" sign as "change( )", and in some cases, an argument to be delivered to the operation is described as, for example, "(argument 1, argument 2)".

The respective classes included in the document handling unit 212, which is the characteristic part of the first embodiment shown in FIG. 10, is explained next.

The document operation scheduler class 1001 manages and operates the document to perform the document processing corresponding to a request received from the request manager 211, and creates an object of the sub-class of the user document class 1002 corresponding to the request. Specifically, the document operation scheduler class 1001 includes registration( ) 1001a as the operation. The document operation scheduler class 1001 performs scheduling of the document processing requested from the request manager 211.

The registration( ) 1001a receives a request of the document processing from the request manager 211 and creates the object of the sub-class of the user document class 1002 corresponding to the received request. In the information transferred as an argument of the registration( ) 1001a, information set to the document processing by the user is included. A document operation scheduler object 1001A determines whether to perform parallel processing of the input processing and the output processing of the document data or to perform sequential processing, based on the information, and creates ether a user document parallel object 1003A or a user document sequential object 1004A. The user document parallel object 1003A and the user document sequential object 1004A will be explained later.

The user document class 1002 inputs the input document to perform processing therefor, and controls the process until an output document (for example, paper document, electronic document, or Fax-received document) is output to the output destination. The user document class 1002 derives a specification for realizing the user's request from the information set when the user uses the multifunction product 1, and instructs the input document class 1011 and the output document class 1021 to satisfy the derived specification. The user document class 1002 is an upper class (super class) of the user document parallel class 1003 and the user document sequential class 1004, and the user document class 1002 itself is not substantiated. However, the attribute and the operation of the user document class 1002 are taken over by the user document parallel class 1003 and the user document sequential class 1004, which are lower classes (sub-classes). Specifically, the user document class 1002 has start( ) 1002a as the operation. The sub-class of the user document class 1002 deletes the objects of the sub-class of the input document class 1011 and the sub-class of the output document class 1021, after the document processing has finished.

The start( ) 1002a is a trigger for starting the output processing. When the start( ) 1021b is called from the user document object 1002A, the start( ) 1021b performs trigger processing for the user document class 1002 to start the document processing. The start( ) 1002a is taken over by the user document parallel class 1003 and the user document sequential class 1004, which are the sub-classes, and overridden by specific processing in the respective sub-classes. The specific processing will be explained in the explanation of the user document parallel class 1003 and the user document sequential class 1004.

The user document parallel class 1003 is a sub-class of the user document class 1002, and controls parallel execution from the input processing to the output processing, when the user document parallel class 1003 receives start of the document processing from the document operation scheduler class 1001. In the first embodiment, the user document parallel class 1003 creates an object of the sub-class of the input document class 1011 and an object of the sub-class of the output document class 1021 corresponding to the output destination, when the user document parallel class 1003 receives a request to start the document processing from the document operation scheduler class 1001, and executes the input processing and the output processing of the document data in parallel. The parallel processing of the input processing and the output processing of the document data means that for example, pages for which the input processing has finished are sequentially processed and output, and while the output processing is carried out, the input processing is performed for other pages. That is, the input processing of the input document, and the processing and the output processing of the output processing are carried out in parallel. As for the situation where the user document parallel object 1003A performs processing, for example, it can be considered a situation when the image data on the paper document is directly copied without storing in the memory, or directly transmitted from the FAX.

Specifically, the user document class 1003 has a parallel processor( ) 1003a as the operation, and takes over the start( ) 1002a from the user document class 1002. The user document parallel class 1003 holds timing or the like for performing the input processing and output processing of the document data in parallel as the attribute (not shown in FIG. 10).

The user document parallel object 1003a determines the input source from the information transferred as the argument by the start( ) 1002a, creates the input net document object 1015A, the input paper document object 1016A, or the input LS document object 1017A based on the determination. Furthermore, the user document parallel object 1003A determines the output destination from the information transferred as the argument, and creates the output net document object 1025A, the output paper document object 1026A, or the output LS document object 1027A based on the determination.

The start( ) 1002a taken over from the user document class 1002 instructs start of the document processing to the user document parallel class 1003. The parallel processing( ) 1003a is called from the user document parallel object 1003A itself having received the start instruction, to perform setting for performing the parallel processing.

The user document sequential class 1004 is a sub-class of the user document class 1002, and when having received the start instruction of the document processing from the document operation scheduler class 1001, controls sequential execution from the input processing to the output processing. In the first embodiment, when the document operation scheduler class 1001 requests start of the document processing, the user document sequential class 1004 creates a sub-class object of the input document class 1011 to perform input processing, and then creates a sub-class object of the output document class 1021 corresponding to the output destination, to perform output processing. The sequential execution means that all documents are input and stored in the memory, and the processing of the document data stored in the memory is performed to output the processed document data. The situation where the user document sequential object 1004A created from the user document sequential class 1004 performs processing includes a situation when intensive printing is performed, for example, at the time of receiving FAX, and when memory transmission is performed by using the FAX.

Specifically, the user document sequential class 1004 has sequential processing( ) 1004a as the operation, and takes over the start( ) 1002a from the user document class 1002. The user document sequential class 1004 holds the timing and the like of the input processing of the input document and the output processing of the output document as the attribute (not shown in FIG. 10).

The user document sequential object 1004A determines the object to be created from the information received as the argument, as in the user document parallel object 1003A.

The start( ) 1002a taken over from the user document class 1002 instructs start of the document processing to the user document sequential class 1004. When the start( ) 1002a instructs start, the sequential processing( ) 1004a is called from the user document sequential object 1004A itself to perform setting for sequentially performing processing from the input processing to the output processing.

The input document class 1011 manages the input document input from the input source by fitting the input document to a common predetermined format, regardless of the input source, in other words, to an input page formed of the input image and the input layout. The input source includes, for example, the scanner, equipment connected thereto via the network, an input unit such as FAX reception or a local storage. The input document class 1011 is the upper class (super class) of the input net document class 1015, the input paper document class 1016, and the input LS document class 1017, and the input document class 1011 itself is not substantiated. However, the attribute and the operation of the input document class 1011 are taken over by the input net document class 1015, the input paper document class 1016, and the input LS document class 1017, which are the lower classes (sub-classes). Specifically, the input document class 1011 has number of pages 1011a as the attribute, and start( ) 1011b as the operation.

The number of pages 1011a holds the number of pages of the input document. The input document class 1011 creates input page objects 1012A for the held number of pages.

The start( ) 1011b performs trigger processing for the input document class 1011 to start the document processing. The start( ) 1011b is taken over by input net document class 1015, the input paper document class 1016, and the input LS document class 1017, which are the sub-classes, and overridden by specific processing in the respective sub-classes. The specific processing will be explained in the explanation of the input net document class 1015, the input paper document class 1016, and the input LS document class 1017.

The input net document class 1015 is a sub-class of the input document class 1011. The input net document class 1015 divides the input document of the document obtained from the input source of the connected network into pages, creates an input page object 1012A for each of the divided pages, and instructs management of the relevant page to the input page objects 1012A, thereby managing the input document.

Specifically, the input net document class 1015 takes over the number of pages 1011a as the attribute and the start( ) 1011b as the operation from the input document class 1011. Furthermore, the input net document class 1015 holds the specification required for performing the input processing via the network as the attribute (not shown in FIG. 10). When the object substantiating the input net document class 1015 is created, since the specification required for performing the input processing and the number of pages 1011a held as the attribute are expanded on the RAM 12b, these data (attributes) can be written and read.

The start( ) 1011b taken over from the input document class 1011 is a trigger for starting the input processing. When the start( ) 1011b is called from the user document object 1002A, the input net document class 1015 receives the document via the network, inputs the input document in a format different for each input source, and converts the input document to another input document. The format of the input document is a common format regardless of the input source.

When receiving the document for performing the input processing of the document by the start( ) 1011b via the network, the input net document object 1015A specifies the document input via the network from the information received as the argument, and connects to the network using the FAX transfer controller 102e or the network communication controller 102f available via the execution controller 213 to receive the document.

The input paper document class 1016 is a sub-class of the input document class 1011. The input paper document class 1016 divides the input document obtained by inputting the document read by the scanner 151a into pages, creates the input page object 1012A for each divided page, and instructs management of the relevant page to the input page object 1012A, thereby managing the input document.

Specifically, the input paper document class 1016 takes over the number of pages 1011a as the attribute and the start( ) 1011b as the operation from the input document class 1011. Furthermore, the input paper document class 1016 holds setting and specification for reading the document from the scanner 151a (not shown in FIG. 10). When the object substantiating the input paper document class 1016 is created, since the setting and the specification required for reading the document held as the attribute and the number of pages 1011a are expanded on the RAM 12b, these data (attributes) can be written and read.

The start( ) 1011b taken over from the input document class 1011 is a trigger for starting the input processing. When the start( ) 1011b is called from the user document object 1002A, the input paper document class 1016 reads the document by the scanner 151a, converts the read document to the input document, and manages the input document.

When reading the document by the scanner 101a according to the start( ) 101b, the input paper document class 1016 uses the scanner controller 102a available via the execution controller 213, to read the document. When the input paper document object 1016A reads the document printed on the both sides of paper, the input paper document object 1016A converts the document obtained by sequentially reading the front and the back sides to the input document. However, there is no concept of front and back in the input document. That is, the read document becomes the input document allocated as an input page in order of read, regardless of the read of only the surface side or the double sides. Accordingly, since the input documents are held in the common format, regardless of a difference in the characteristic of the media or a difference in the document handling mode by the scanner 151a, different processing corresponding to a difference of the input source is not necessary, thereby facilitating the processing.

The input LS document class 1017 is a sub-class of the input document class 1011. The input LS class 1017 divides the input document obtained by inputting an electronic document read from the local storage such as the hard disk into pages, creates the input page object 1012A for each divided page, and instructs management of the relevant page to the input page object 1012A, thereby managing the input document.

Specifically, the input LS document class 1017 takes over the number of pages 1011a as the attribute and the start( ) 1011b as the operation from the input document class 1011. Furthermore, the input LS document class 1017 holds setting and specification for reading the electronic document from the local storage (not shown in FIG. 10). When the object substantiating the input LS document class 1017 is created, since the setting and the specification required for reading the electronic document from the local storage as the attribute and the number of pages 1011a are expanded on the RAM 12b, these data (attributes) can be written and read.

The start( ) 1011b taken over from the input document class 1011 is a trigger for starting the input processing. When the start( ) 1011b is called from the user document object 1002A, the input LS document class 1017 reads the electronic document from the local storage, converts the read electronic document to the input document, and manages the input document.

When the input LS document class 1017 reads the electronic document according to the start( ) 101b, the storage controller 102c available via the execution controller 213 is used for reading the document.

Since the input documents managed by the input net document class 1015, the input paper document class 1016, and the input LS document class 1017 are held by using the common input page class 1012, input layout class 1013, and input image class 1014, regardless of the input source. The input page class 1012, the input layout class 1013, the input image class 1014 are explained next.

The input page class 1012 manages the respective pages divided from the input document managed by the input document class 1011 as input pages. The input page class 1012 creates the input layout object 1013A and the input image object 1014A, and manages these as a configuration in which the input image is fitted to the input layout.

When the input layout is set for each page, and for example, when the user sets the document read by the scanner 151a as an intensive document of "2 in 1", the input layout becomes such that two input images are fitted to the input layout, and the input layout object 1013A satisfying the condition is created.

Specifically, the input page class 1012 has a page number 1012a as the attribute and the start( ) 1012b as the operation. When an object substantiating the input page class 1012 is created, since the page number 1012a is expanded as the attribute on the RAM 12b, the data (attribute) can be read and written.

The page number 1012a holds numbers indicating the page managed by the input page object 1012A. That is, since the input page objects 1012A are created for the number of pages 1011a held by the input document object 1011A, the page numbers allocated to the input page objects 1012A are held in the page number 1012a.

The start( ) 1012b is a trigger for the input page class 1012 to start the page processing. When the start( ) 1011b is called from the sub-class object of the input document class 1011 such as the input net document object 1015A, the start( ) 1012b obtains the page information in the input document corresponding to the page number received as the argument, to start creation of the input layout object 1013A and the input image object 1014A, based on the obtained page information.

When the start( ) 1012b is called, the input page class 1012 obtains the page information in the corresponding input document managed by the input document class 1011, and uses the created input layout object 1013A and the input image object 1014A to manage the input page.

The input layout class 1013 creates and manages a layout (hereinafter, "input layout") used for applying the input image to the input page managed by the input page class 1012. Specifically, the input layout class 1013 has information of an outer frame, an inner frame, or an offset position as the attribute (not shown in FIG. 10). The input layout class 1013 has creation( ) 1013a as the operation. When an object substantiating the input layout class 1013 is created, since the information of the outer frame, the inner frame, or the offset position as the attribute is expanded on the RAM 12b, the data (attributes) can be read and written.

The creation( ) 1013a creates an input layout in which the input layout object 1013A arranges the input image at a suitable position in the input page. When the creation( ) 1013a is called from the input page object 1012A, the outer frame, the inner frame, or the offset position corresponding to the user's request is set as the attribute from the information received as the argument, thereby creating the input layout. Accordingly, the number of input images in the input page is determined. That is, the input page can be divided into the minimum units of document handling, referred to as an input image.

The input image class 1014 manages the images (hereinafter, "input images") fitted to the arrangement determined by the input layout with respect to the input page. Specifically, the input image class 1014 reads and holds the entity of the image in a range of the input image from the input document created by the sub-class object of the input document class 1011. The input image class 1014 has information for specifying the entity of the image read as the attribute and start( ) 1014a as the operation. When an object substantiating the input image class 1014 is created, since the image for specifying the entity of the read image is expanded on the RAM 12b, the data (attributes) can be read and written.

The input image stands for an image fitted to the input layout, and becomes an image of a predetermined size, that is, an image divided into the minimum units of document handling in the first embodiment. The minimum unit of document handling stands for an area that can be formed as one page. For example, when a special setting is not performed, the whole area of one page becomes the input image. When "2 in 1" is set, respective areas obtained by dividing one page into two become the input image. The input image is not only a simple image, but also includes character information and graphics shown in the area.

The start( ) 1014a is a trigger for the input image class 1014 to start the image processing. When the start( ) 1014a is called from the input page object 1012A, the start( ) 1014a reads the entity of the image in the range determined by the setting of the input layout and the like received as the argument, and writes information specifying the entity of the read image as the attribute, to create a user image object 1005A that manages the user image corresponding to the input image.

The user image class 1005 manages the user images to be processed, which are created from the input images, and performs processing for creating the output images. Specifically, the user image class 1005 has the information specifying the user image formed as the attribute, and creation 1005a and use 1005b as the operation. When an object substantiating the user image class 1005 is created, since the information specifying the created image is expanded on the RAM 12b, the data (attributes) can be written and read.

The user image stands for an image to be processed, and an image of a predetermined size, that is, in the first embodiment, an image divided into the minimum units of document handling. The minimum unit of document handling has been explained in the input image, and hence, the explanation thereof is omitted. The user image is not only a simple image, but also includes character information and graphics shown in the area of the predetermined size as the user image.

The creation( ) 1005a is called from the input image class 1014, and creates the user image based on the input image to which the user image class 1005 corresponds. When the creation( ) 1005a is called from the input image object 1014A, the creation( ) 1005a reads the entity of the input image and writes the information for specifying the entity of the read image in the attribute as the user image.

The use( ) 1005b processes the entity of the image called from the input image class 1014 and read by the creation( ) 1005a so as to become suitable for the output form, and transmits the processed entity of the image to the output image class 1024, to create an output image. As an example of the processing, when a document input one by one is desired to be output by "2 in 1", processing for reducing the user image is performed.

The output document class 1021 creates a common predetermined format, that is, an output document formed of output pages obtained by combining outputs images and output layouts, regardless of the output destination, and outputs the output document to the output destination. The output document class 1021 is the upper class (super class) of the output net document class 1025, the output paper document class 1026, and the output LS document class 1027, and the output document class 1021 itself is not substantiated. However, the attribute and the operation of the output document class 1021 are taken over to the output net document class 1025, the output paper document class 1026, and the output LS document class 1027, which are the lower classes (sub-classes). Specifically, the output document class 1021 has the number of pages 1021a as the attribute and the start( ) 1021b as the operation.

The number of pages 1021a holds the number of pages of the output document. The number of pages of the output document can be obtained from the setting at the time of output with respect to the multifunction product 1 and the number of user images held by the user document object 1002A. Specifically, the number of pages is obtained from the number of user images transferred as the argument when the star to 1021b is called, the output layout determined by the setting at the time of output, and the like, and is set in the number of pages 1021a. For example, at the time of sequential processing, when the number of user images held by the user document object 1002A is four and the user sets to output by "2 in 1", the number of pages 1021a is set to "2". The output document class 1021 creates the output page objects 1022A for the number of pages. When the number of pages 1021a performs parallel processing, the necessary number of pages is added every time the number of input pages increases by the input processing.

The start( ) 1021b is a trigger for the output document class 1021 to start the document processing. The start( ) 1021b is taken over by the output net document class 1025, the output paper document class 1026, and the output LS document class 1027, which are the sub-classes, and overridden by specific processing in the respective sub-classes. The specific processing will be explained in the explanation of the output net document class 1025, the output paper document class 1026, and the output LS document class 1027.

The output net document class 1025 is a sub-class of the output document class 1021. The output net document class 1025 connects to the output destination of the output document via the network, and instructs the output page object 1022A to perform output processing for each output page of the output document. The output net document class 1025 also instructs the execution controller 213 to control the communication corresponding to a protocol different for each output destination, for example, according to FAX transmission, e-mail transmission, or file transfer. Furthermore, the output net document class 1025 prepares an output document format corresponding to the communication method, forms the output document in the format corresponding to the output destination and outputs the output document. The format is assumed to be a well-known format normally used for communication, for example, for FAX transmission.

Specifically, the output net document class 1025 takes over the number of pages 1021$a$ as the attribute and the start( ) 1021$b$ as the operation. Furthermore, the output net document class 1025 holds the specification and setting necessary for output processing via the network as the attribute (not shown in FIG. 10). When an object substantiating the output net document class 1025 is created, since the specification and setting held as the attribute and necessary for output processing are expanded on the RAM 12$b$, the data (attributes) can be written and read.

The start( ) 1021$b$ taken over from the output document class 1021 is a trigger for starting the output processing. When the start( ) 1021$b$ is called from the user document object 1002A, the output net document class 1025 connects to the output destination via the network, creates an output document formed in the format corresponding to the output destination by using the user images formed beforehand, and outputs the output document.

The output net document object 1025A specifies the output destination from the information received as the argument of the start( ) 1021$b$ via the network, connects to the network by using the FAX transfer controller 102$e$ or the network communication controller 102$f$ available via the execution controller 213, and performs the processing such as registration of the output document to be output to the output destination. Accordingly, the information for forming the output document output by the output page class 1022 or the output image class 1024, for example, the output layout, the output image, and the like can be output to the output destination.

The output paper document class 1026 is a sub-class of the output document class 1021. The output paper document class 1026 controls the plotter 151$b$ and instructs the output page object 1022A to output the output document for each output page. The output paper document class 1026 instructs the execution controller 213 to control the plotter 151$b$ and output the output document, prepares a format suitable for output by the plotter 151$b$, and uses the prepared format to output the output document.

Specifically, the output paper document class 1026 takes over the number of pages 1021$a$ as the attribute and the start( ) 1021$b$ as the operation. The output paper document class 1026 holds the setting and the specification for outputting the document from the plotter 151$b$ as the attribute (not shown in FIG. 10). When an object substantiating the output document class 1026 is created, since the setting and the specification for outputting the document as the attribute, and the number of pages 1021$a$ are expanded on the RAM 12$b$, the data (attributes) can written and read.

The start( ) 1021$b$ taken over from the output document class 1021 is a trigger for starting the output processing. When the start( ) 1021$b$ is called from the user document object 1002A, the start( ) 1021$b$ uses the format in which the output paper document class 1026 prints by the plotter 151$b$, to output the output document.

When the start( ) 1021$b$ is called, the output paper document class 1026 controls output with respect to the plotter 151$b$ by the plotter controller 102$b$ available via the execution controller 213 at the time of printing. Furthermore, the output paper document class 1026 instructs the output page object 1022 to set the layout suitable for printing and arrangement of the output images. Accordingly, common processing can be performed, regardless of the characteristic of the media or a difference of the document handling mode by the plotter 151$b$. The output paper document class 1026 determines whether to print only on the front side or on the front and back sides of paper based on the setting input by the user, and instructs to control the plotter 151$b$ to follow the determination.

The output LS document class 1027 is a sub-class of the output document class 1021, and determines a storage place in the local storage such as the hard disk and instructs the output page object 1022A to output the output document for each output page. There is no limitation on the format of the electronic document at the time of storing the output document in the local storage.

Specifically, the output LS document class 1027 takes over the number of pages 1021$a$ as the attribute and the start( ) 1021$b$ as the operation from the output document class 1021. The output LS document class 1027 holds the setting and specification as the attribute to be stored in the local storage (not shown in FIG. 10). When an object substantiating the output LS document class 1027 is created, since the setting and the specification to be stored in the local storage as the attribute, and the number of pages 1021$a$ are expanded on the RAM 12$b$, the data (attribute) can be written and read.

The start( ) 1021$b$ taken over from the output document class 1021 is a trigger for starting the output processing. When the start( ) 1021$b$ is called from the user document object 1002A, the start( ) 1021$b$ creates an output document in the format used when the output LS document class 1027 specifies the storage place of the local storage, registers the file name and the like of the electronic document to be stored, and stores the electronic document by using the user images formed beforehand.

The output LS document class 1027A specifies the storage destination and the file name of the Electronic document from the information received as the argument of the start( ) 1021$b$ and performs the processing such as registration of the output document in the storing place of the local storage by using the accumulation controller 102$c$ available via the execution controller 213. Therefore, output of the information relating to the output document, for example, the output layout and the output image can be output from the output page class 1022 or the output image class 1024.

The output page class 1022 creates respective pages constituting the output document created by the output document class 1021 as the output pages and outputs the setting such as layout for each page to the output destination. The output page class 1022 creates an output layout object 1023A and an output image object 1024A, and also creates the output page in which the output images are fitted to the output layout.

Specifically, the output page class 1022 includes the page number 1022$a$ as the attribute, and the start( ) 1022$b$ as the operation. When an object substantiating the output page class 1022 is created, since the page number 1022$a$ is expanded on the RAM 12$b$ as the attribute, the data (attributes) can be written and read.

The page number 1022$a$ holds the number indicating the page formed by the output page object 1022A. That is, since the output page objects 1022A are formed for the page number 1011$a$ held by the output document object 1021A, the page number 1012*a* is held for specifying the pages to which the output page objects 1022A are allocated.

The start( ) 1022*b* is a trigger for the output page class 1022 to start the page processing. When the start( ) 1022*b* is called from the sub-class object of the output document class 1021, such as the output net document object 1025A, the output page class 1022 obtains the information of the page determined by the page number received as the argument and the setting received by the user, and creates the output layout object 1023A and the output image object 1024A based on the information of the obtained page information.

Furthermore, when the start( ) 1022*b* is called, the output page class 1022 outputs the setting of each page of the output layout and the like to the output destination, by using the output layout object 1023A created by obtaining corresponding page information (hereinafter, "output page") from output documents managed by the output document class 1021, and the output page class 1022 then creates the output image object 1024A that holds an output image that is applied to the output layout.

The output layout class 1023 creates and manages the layout (hereinafter, "output layout") used for applying the output image to the input page created by the output page class 1022. Specifically, the output layout class 1023 includes the information such as the outer frame, the inner frame, or the offset position as the attribute (not shown in FIG. 10). Furthermore, the output layout class 1023 includes creation( ) 1023*a* as the operation. When an object substantiating the output layout class 1023, since the information such as outer frame, the inner frame, or the offset position is expanded as the attribute on the RAM 12*b*, the data (attributes) can be written and read.

The creation( ) 1023*a* performs setting so that the output layout object 1023A can arrange the output image at a suitable position on the output page. When the creation( ) 1023*a* is called from the output page object 1022A, the outer frame, the inner frame, or the offset position included as the attribute is set from the information received as the argument. The number of the output images in the output page is determined by the setting. Accordingly, the minimum unit of document handling, that is, the output image can be fitted to the output page.

The output image class 1024 creates and outputs the image (hereinafter, "output image") fitted to the arrangement determined by the output layout to the output page. Specifically, the output image class 1024 obtains the output image in a format suitable for the output destination created based on the user image created by the user image object 1005A. The output image class 1024 includes information for holding the output image as the attribute and start( ) 1024*a* as the operation. When an object substantiating the output image class 1024 is created, since the information for holding the output image is expanded on the RAM 12*b*, the data (attributes) can be written and read.

The output image is an image fitted to the output layout, and the output image is an image of a predetermined size like the input image and the user image, and an image divided into the minimum unit of document handling in the embodiment. The output image includes not only a simple image, but also the character information, the figure, and the like displayed in a frame determined by the output layout.

The start( ) 1024*b* is a trigger for the output image class 1024 to start the image processing. When the start( ) 1024*b* is called from the output page object 1022A, the output image class 1024 specifies the corresponding user image from the information received as the argument, and calls use( ) 1005*b* in the user image object 1005A. Therefore, the output image processed so as to be fitted to the output layout from the user image, and the received output image is output to the output destination.

FIG. 11 is an explanatory diagram of the process for creating an output document of "4 in 1" from an input document of "2 in 1" in the document handling unit 212 in the embodiment. As shown in FIG. 11, the document handling unit 212 can perform document processing easily in a unit of image by using a combination of a layout and images to be fitted to the layout for each page.

Referring back to FIG. 10, a relationship between the respective classes will be explained. As shown in FIG. 10, the straight line connecting rectangles indicating the respective classes expresses that there is a relationship between the classes at the opposite ends, and the character near the opposite ends of the straight line indicates the role of the class and the figure indicates the degree of multiplexing of the classes. The role is a role or a position of one class as seen from the other class at the opposite ends of the straight line, and the degree of multiplexing is a correspondence of the number of objects created from the classes at the opposite ends of the straight line.

For example, the role of the user document class 1002 as seen from the document operation scheduler class 1001 is "request", and the role of the document operation scheduler class 1001 as seen from the user document class 1002 is "reception". The degree of multiplexing of the document operation scheduler class 1001 is "1", and the degree of multiplexing of the user document class 1002 is "0 . . . *" "0 . . . *" indicates that the degree of multiplexing of the user document class 1002 is in a range from 0 without upper limit. For example, when the degree of multiplexing is described as "1 . . . 3", it indicates that the degree of multiplexing of the class is in a range from 1 to 3.

As shown in FIG. 10, when the document handling unit 212 executes the processing, there is only one object in which the document operation scheduler class 1001 is expanded (substantiated) on the RAM 12*b*, and the object substantiating the user document class 1002, which is the request target of the document processing by the document operation scheduler 1001, is present in the number equal to or larger than 0 without an upper limitation.

The class relationship between the user document class 1002 and the input document class 1011 is explained next. The input document class 1011 has a role as the input document used for creating the user document, as seen from the user document class 1002, and on the other hand, the user document class 1002 has a role as the user document for which the processing is performed, as seen from the input document class 1011. The user document to be processed can be created from the document input according to such a class relationship.

Since the input document class 1011 is created corresponding to the number of documents required at the time of creating the user document to perform the input processing, while the user document class 1002 is created for each request from the user, the user document class 1002 and the input document class 1011 have a one-to-many relationship. A plurality of input documents is input at the time of creating one user document, for example, when there is a request to print a FAX-received document and a prestored electronic document as one united document. Furthermore, this can be when it is desired to output documents of different input sources, for example, a "paper" document and a "net" document, or when it is desired to output a plurality of input documents of the same input source such as two "net" documents as one united document.

A relationship between the input document class 1011, the input net document class 1015, the input paper document class 1016, and the input LS document class 1017 is explained next. The input document class 1011 is the upper class (super class) of the input net document class 1015, the input paper document class 1016, and the input LS document class 1017. The input net document class 1015, the input paper document class 1016, and the input LS document class 1017 take over the attribute and the operation of the input document class 1011.

A relationship between the input document class 1011 and the input page class 1012 is also explained. The input page class 1012 is created for each page of the document held by the input document class 1011. Therefore, the input page class 1012 has a role as a page as seen from the input document class 1011, and on the other hand, the input document class 1011 has a role as a document as seen from the input page class 1012.

Since the input page class 1012 is created for each page, while the input document class 1011 created for each input document to be input, the input document class 1011 and the input page class 1012 has a one-to-many relationship. Furthermore, the input page class 1012 is consolidated in the input document class 1011.

A relationship between the input page class 1012 and the input layout class 1013 is explained next. The input page class 1012 is created for each page, and the input layout class 1013 is a layout determined for each page. That is, the input layout class 1013 has a role as a frame for each page as seen from the input page class 1012, and on the other hand, the input page class 1012 has a role as a page as seen from the input layout class 1013. Accordingly, the input page class 1012 and the input layout class 1013 has a one-to-one relationship.

A relationship between the input page class 1012 and the input image class 1014 is also explained. The input image class 1014 is created for each area divided according to the layout of the page held by the input page class 1012. Therefore, the input image class 1014 has a role as an in-frame structure fitted to the frame held in the page as seen from the input page class 1012. On the other hand, the input page class 1012 has a role as a page as seen from the input image class 1014.

Since the input image class 1014 is created for the number divided according to the layout held in the page, while the input page class 1012 is created for each page of the input document, the input page class 1012 and the input image class 1014 have a one-to-many relationship. The input image class 1014 is consolidated to the input page class 1012.

A relationship between the input image class 1014 and the user image class 1005 is explained next. The input image class 1014 is created for the number divided according to the frame held in the page, and the user document class 1005 is created as a processing target based on the input image. That is, the user image class 1005 has a role as a created article as seen from the input image class 1014. On the other hand, the input image class 1014 has a role as an input article as seen from the user image class 1005.

Since the user image class 1005 is created based on the input image class 1014, and the input image class 1014 and the user image class 1005 are divided by the minimum unit of document handling, the input image class 1014 and the user image class 1005 have the one-to-one relationship.

A relationship between the user document class 1002, the user document parallel class 1003, and the user document sequential class 1004 is explained next. The user document class 1002 is the upper class (super class) of the user document parallel class 1003 and the user document sequential class 1004, and the user document parallel class 1003 and the user document sequential class 1004 take over the attribute and the operation of the user document class 1002.

A relationship between the user document class 1002 and the user image class 1005 is also explained. The user image class 1005 is created for each image, which is the minimum unit of document handling constituting the user document held by the user document class 1002. Therefore, the user image class 1005 has a role as a component as seen from the user documents class 1002. On the other hand, the user document class 1002 has a role as a document as seen from the user image class 1005.

Since the user document class 1002 is created for each document, while the user image class 1005 is created for each image constituting the document, the user document class 1002 and the user image class 1005 have the one-to-many relationship. The user image class 1005 is consolidated to the user document class 1002.

A class relationship between the user document class 1002 and the output document class 1021 is explained next. The output document class 1021 has a role as an output document output in the output form corresponding to the user's request as seen from the user document class 1002. On the other hand, the user document class 1002 has a role as a user document as seen from the output document class 1021. Based on such a class relationship, an output document can be created from a user document to be processed.

The user document class 1002 is created for each document processing by the document operation scheduler class 1001, and the output document class 1021 is created for each document corresponding to the user's request. Therefore, it is a matter of course that a plurality of document can be output based on one document processing request. That is, the user document class 1002 and the user image class 1005 have the one-to-many relationship. A plurality of documents is output based on one document processing request, for example, when the user sets to "print and store" a document read by the scanner.

A relationship between the output image class 1024 and the user image class 1005 is explained next. The output image class 1024 is created by using the user images for the number fitted to the frames held by the output page. That is, the output image class 1024 has a role as an output object as seen from the user image class 1005. On the other hand, the user image class 1005 has a role as an object to be used as seen from the output image class 1024.

The output image class 1024 is created based on the user image class 1005, and the output image class 1024 and the user image class 1005 are divided by the minimum unit of document handling. Furthermore, an instance that one user image is used by a plurality of output documents, and an instance that one user image is used for many times in one output document can be considered. Therefore, the user image class 1005 and the output image class 1024 have the one-to-many relationship.

A relationship between the output document class 1021, the output net document class 1025, the output paper document class 1026, and the output LS document class 1027 is the same as the relationship between the input document class 1011, the input net document class 1015, the input paper document class 1016, and the input LS document class 1017, and hence, the explanation thereof is omitted.

Since the relationship between the output document class 1021 and the output page class 1022 is the same as the relationship between the input document class 1011 and the input page class 1012, the relationship between the output page class 1022 and the output layout class 1023 is the same as the relationship between the input page class 1012 and the input layout class 1013, and the relationship between the output page class 1022 and the output image class 1024 is the same as the relationship between the input page class 1012 and the input image class 1014, the explanation thereof is omitted.

The respective objects of the document operation scheduler class 1001, the input document class 1011, the input page class 1012, the input layout class 1013, the input image class 1014, the input net document class 1015, the input paper document class 1016, the input LS document class 1017, the user document class 1002, the user document parallel class 1003, the user document sequential class 1004, the user image class 1005, the output document class 1021, the output page class 1022, the output layout class 1023, the output image class 1024, the output net document class 1025, the output paper document class 1026, and the output LS document class 1027 are associated with each other and cooperate with each other. Accordingly, the function necessary for the document handling unit 212 can be realized.

Figure 12A:
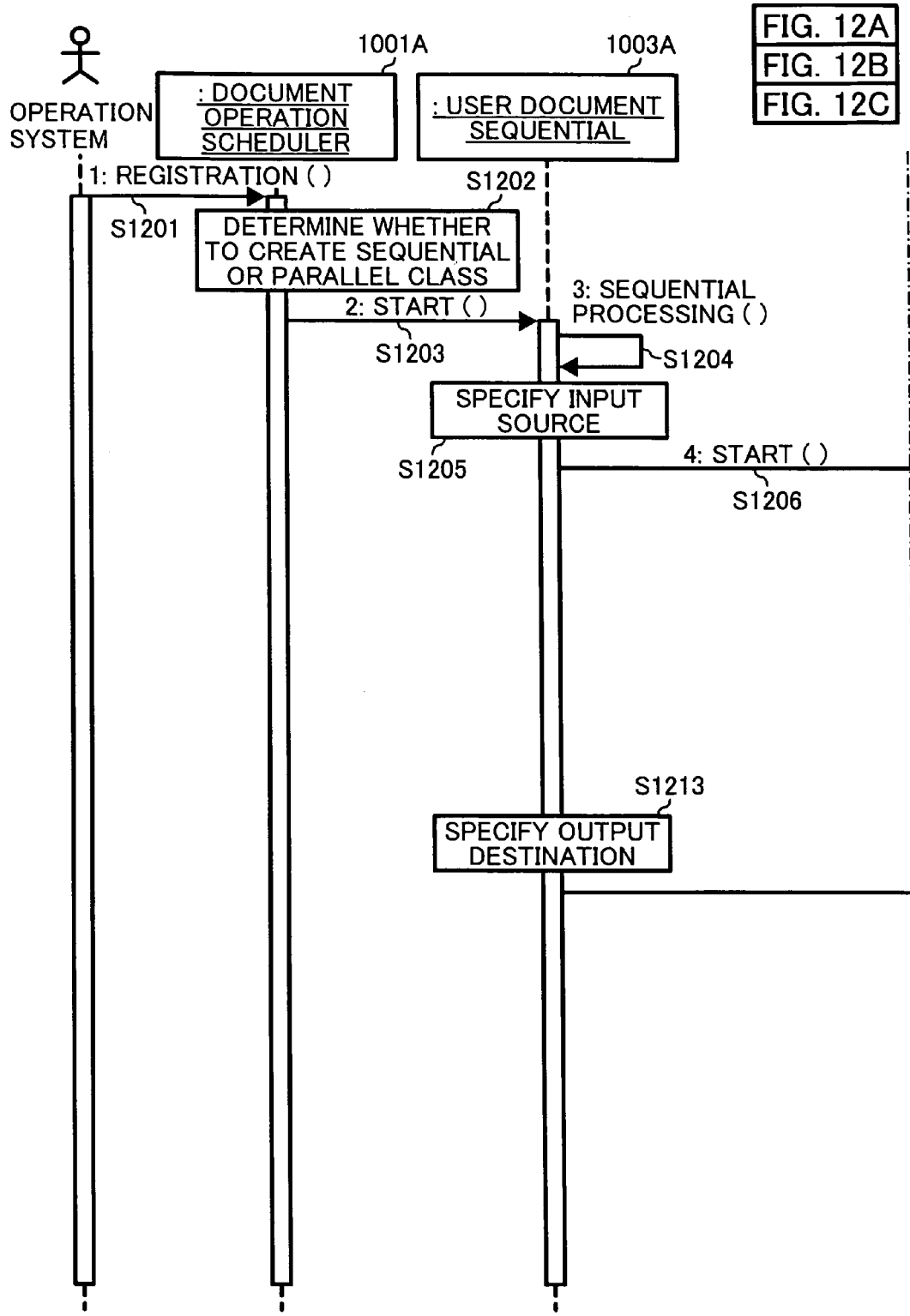
FIG. 12 is a UML sequence diagram of a procedure when the document handling unit according to the embodiment sequentially executes document processing from reading a paper document to transmitting the document to a computer on a network.
Figure 12B:
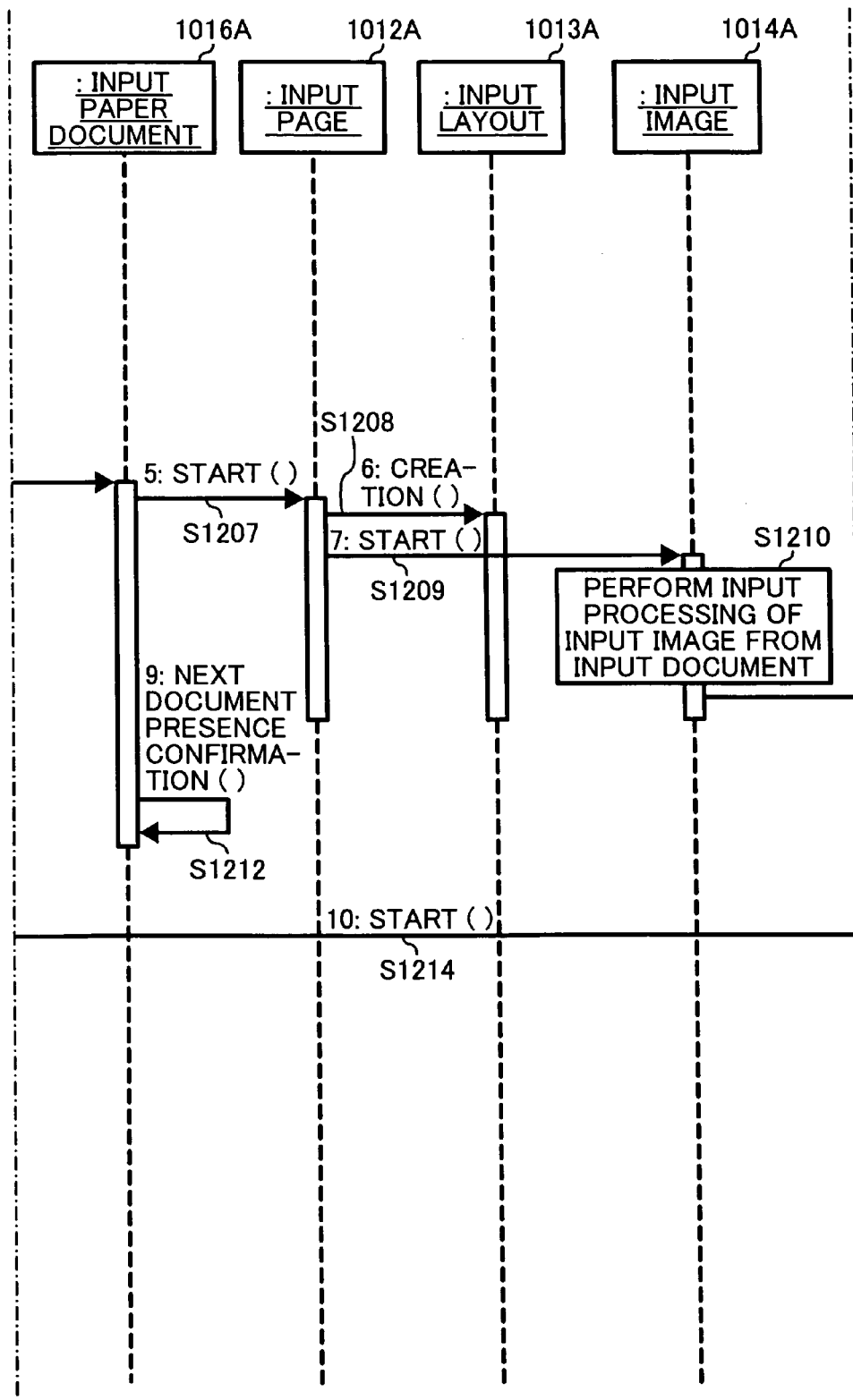
Figure 12C:
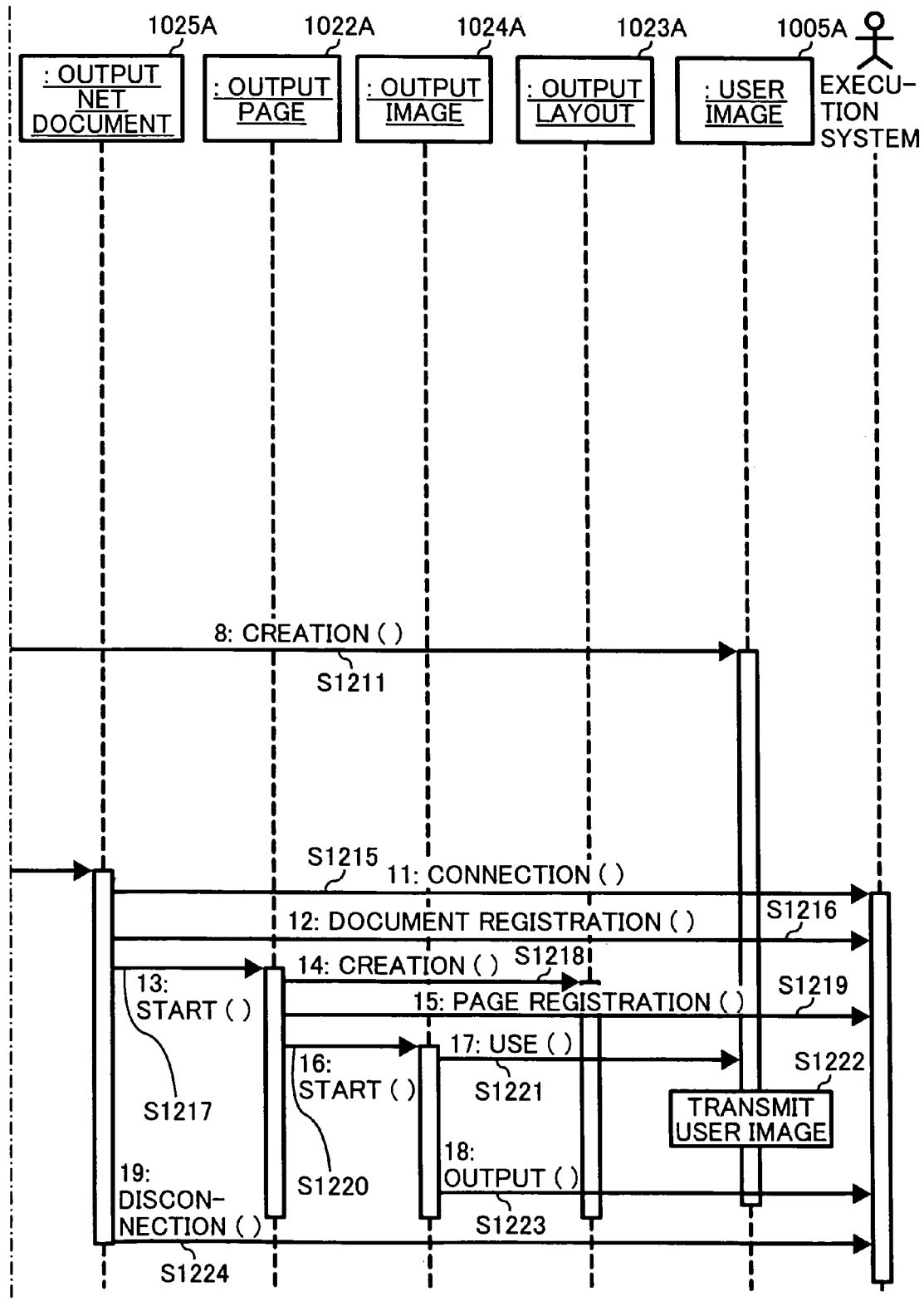

An execution procedure of the operation of the respective classes shown in FIG. 10 is explained by way of examples. FIG. 12 is a UML sequence diagram of a procedure when the document handling unit 212 sequentially executes document processing from reading a paper document to transmitting the document to a computer on the network.

The UML sequence diagram is explained here. Rectangles arranged on the upper part of FIG. 12 respectively indicate objects of the class. The lines extending downward from the respective objects are lines (life-lines) indicating that there is an active object, and it is regarded that time flows from the top downward. The long and slender rectangles present on the lines indicate periods (active periods) in which the relevant object is actually active.

Lateral arrows connecting between the respective life-lines indicate execution of the operation included in the object. Specifically, the arrows indicate that an object at the start of the arrow calls the operation included in the object at the destination of the arrow. Furthermore, when the arrow indicates the own object, it means that the object calls the operation included therein by itself.

As shown in FIG. 12, when the user operates the multifunction product 1 to input an intention to transmit a paper document to a computer on the network, the operation system sub-system 201 registers the request to perform document processing input by the user in the document operation scheduler object 1001A (step S1201). Specifically, the request manager 211 receives the request from the operation system sub-system 201 as a request. The request manager 211 calls the registration( ) 1001a of the document operation scheduler object 1001A in the document handling unit 212 to register the request in the processing destination of the document.

The document operation scheduler object 1001A determines whether to perform the parallel processing or the serial processing from the information received as the argument of the registration( ) 1001a, and determines which object of the user document sequential class 1004 or of the user document parallel class 1003 to be created based on the determination result (step S1202). In the sequential diagram, it is assumed that it is determined to perform the serial processing from the received information. Creation is an operation included in all objects, and the respective objects are substantiated on the RAM 12b by the creation.

The document operation scheduler object 1001A calls the start( ) 1002a, to request start of the document processing with respect to the created user document sequential object 1004A (step S1203).

The user document sequential object 1004A, to which start of the document processing is requested, calls the serial processing( ) 1004a to perform setting necessary for performing the serial processing (step S1204). The user document sequential object 1004A specifies the input source received as the argument from the start( ) 1002a and creates a sub-class of the input document class 1011 corresponding to the input source (step S1205). In the example shown in the sequence diagram, it is assumed that the input source is a paper document, and an object to be created is an object of the input paper document class 1016, which is the sub-class of the input document class 1011.

The user document sequential object 1004A calls the start( ) 1011b of the created input paper document object 1016A and requests start of the input processing of the paper document with respect to the input paper document object 1016A (step S1206).

The input paper document object 1016A controls the scanner 151a through the execution controller 213 in response to the request and starts the input processing by reading the paper document. The input paper document object 1016A creates the input page object 1012A for each page of the read paper document, and calls the start( ) 1012b of the created input page object 1012A, to request start of the input processing for each page of the read paper document (step S1207).

The input page object 1012A starts the input processing of the page, to create the input layout object 1013A, and calls the creation( ) 1013a of the created input layout object 1013A, to set the attribute of the created input layout object 1013A based on the setting input by the user (step S1208). The input layout object 1013A transmits the information relating to the layout, such as arrangement and the number of the input images determined for each page, to the input page object 1012A as a message.

The input page object 1012A creates the input image objects 1014A for the number of the input images for each input page determined by the input layout object 1013A, and calls the start( ) 1014a of the created input image objects 1014A, to request start of the input processing of the input images to the input image objects 1014A (step S1209).

Subsequently, the input image object 1014A inputs the entity of the input image from the area determined by the input layout, from the input document input by using the scanner 151a (step S1210). The input image object 1014A creates a user image object 1005A holding the user image corresponding to the input image, and calls the creation( ) 1005a of the created user image object 1005A (step S1211). The user image object 1005A creates the user image based on the entity of the input image input by the input image object 1014A. The processing at steps S1209 to S1211 is repeated for the number of the input images fitted to the page.

The input paper document object 1016A calls next document presence confirmation( ) 10116b, and confirms whether there is a next document of the paper document with respect to the scanner 151a (step S1212). When there is the next document, the input paper document object 1016A creates the input page object 1012A again and starts the processing from step S1207. When there is no next document, the input paper document object 1016A transmits a message indicating finish of the input processing by the user document sequential object 1004A to finish the processing.

The user document sequential object 1004A specifies the output destination from the information received as the argument by the start( ) 1002a at step S1203, to create a sub-class of the output document class 1021 corresponding to the output destination (step S1213). In the example shown in the sequence diagram, it is assumed that the output destination is a computer on the network, and an object to be created is an object of the output net document class 1025, which is the sub-class of the output document class 1021.

The user document sequential object 1004A calls the start( ) 1021*b* of the created output net document object 1025A, and requests start of the output processing of an electric document to the computer on the network with respect to the output net document object 1025A (step S1214). When the start( ) 1021*b* is called, the number of pages 1021*a* of the output net document object 1025A is set.

The output net document object 1025A connects to the computer at the output destination via the network, by using the network communication controller 102*f* available via the execution controller 213 in response to the request (step S1215). Furthermore, the output net document object 1025A transmits the file name and the like of the electric document to be output to the connected computer, and registers the electric document in the connected computer (step S1216).

The output net document object 1025A creates the output page objects 1022A for the number of pages 1021*a*, and calls the start( ) 1022*b* of the created output page objects 1022A, to request start of the output processing for each page of the electric document (step S1217).

Subsequently, the output page object 1022A starts the output processing of the page. At first, the output page object 1022A creates the output layout object 1023A for outputting the page in the format input by the user, and calls the creation( ) 1023*a* of the created output layout object 1023A, to set an attribute value most suitable for outputting the page in the format input by the user in the attribute of the created output layout object 1023A (step S1218). The output layout object 1023A transmits the information to be transmitted to the computer at the output destination, such as the number of output images to be fitted and the layout, as a message. The output page object 1022A transmits the necessary information of the output page to the connected computer and performs page registration (step S1219).

The output page object 1022A creates the output image objects 1024A for the number of the output images fitted to the output page determined by the output layout object 1023A, and calls the start( ) 1014*a* of the created output image objects 1024A, to request start of the output processing of the output images to the output image object 1024A (step S1220).

Subsequently, the output image object 1024A calls the use( ) 1005*b* of the user image object 1005A, of which correspondence is specified by the information received as the argument of the start( ) 1014*a*, for example, information of the page number or the order of the output image in the page (step S1221). The user image object 1005A performs processing such as scaling with respect to the output images so as to be fitted to the output layout, and transmits the entity of the held images to the output image objects 1024A, which has performed calling (step S1222).

The output image object 1024A then outputs the entity of the received output images to the computer at the output destination (step S1223). The processing of steps S1220 to S1223 is repeated for the number of the output images fitted to the page.

When the whole output processing has finished in the output page objects 1022A created for the number of pages, the output net document object 1025A disconnects communication with the computer after transmitting information indicating that the whole output processing has finished to the computer at the output destination (step S1224). The user document sequential object 1004A transmits a message indicating that the document processing has finished to the document operation scheduler object 1001A, to finish the processing.

Figure 13A:
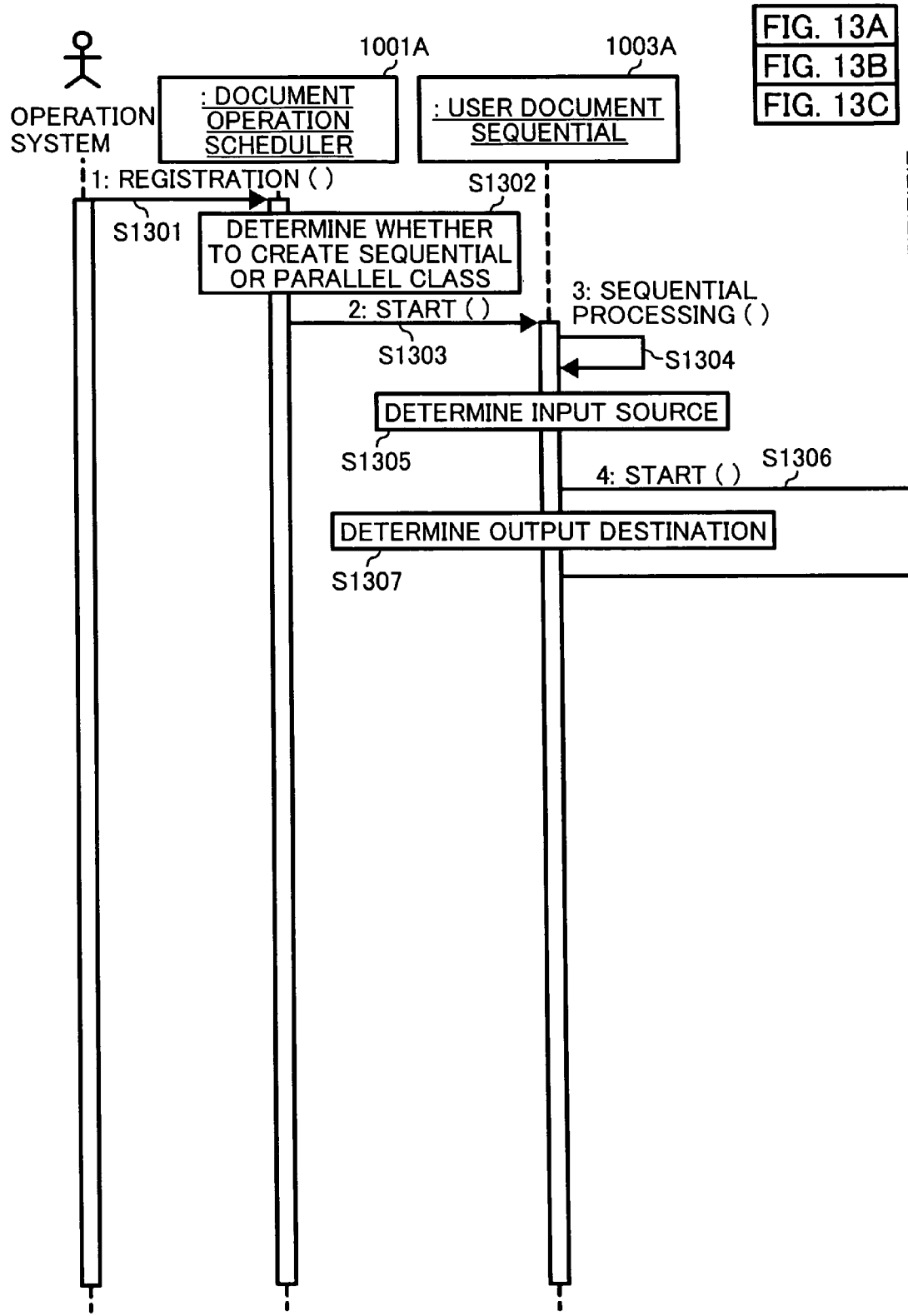
FIG. 13 is a UML sequence diagram of a procedure when the document handling unit according to the embodiment executes document processing from reading the paper document to printing the document in parallel.
Figure 13B:
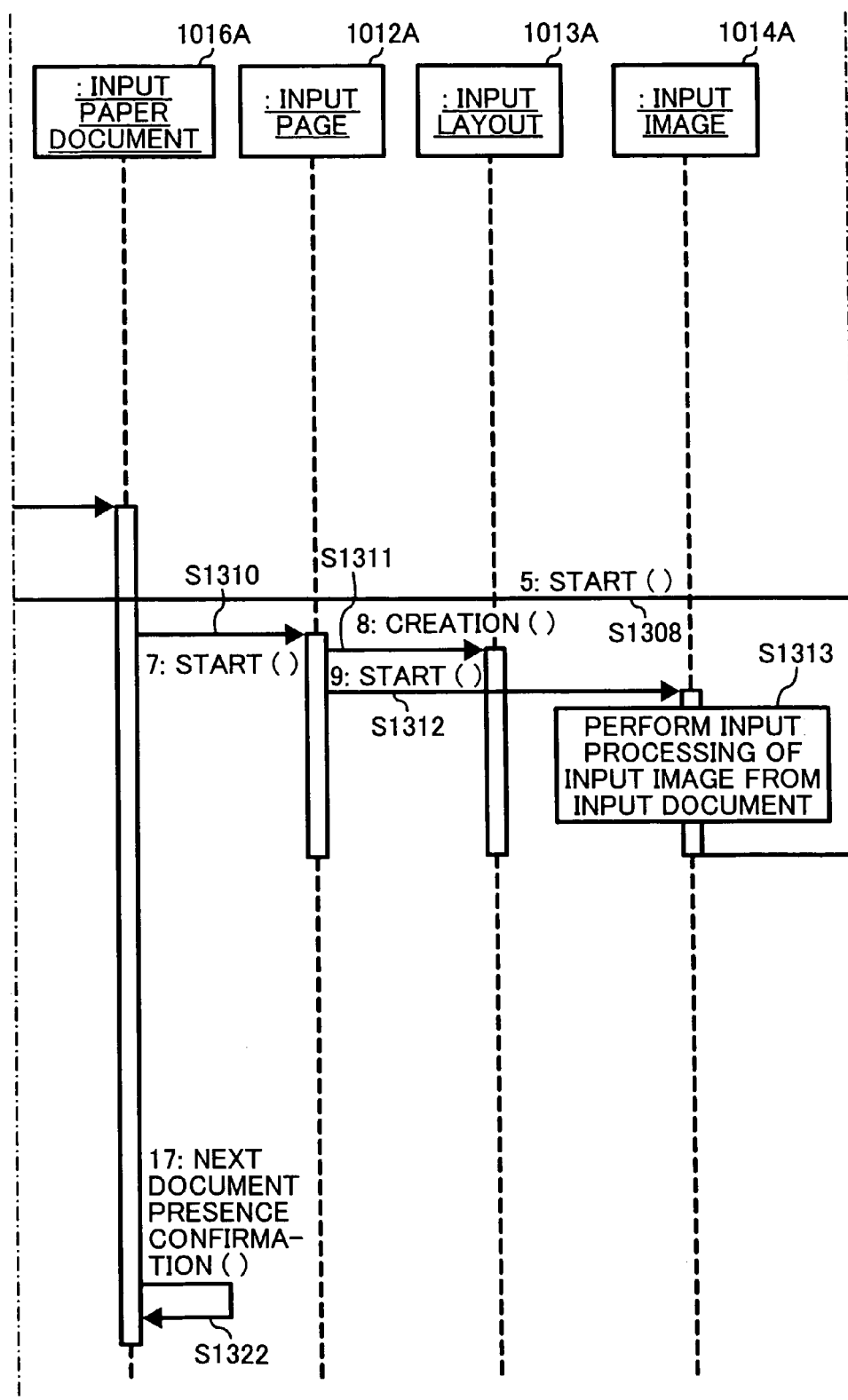
Figure 13C:
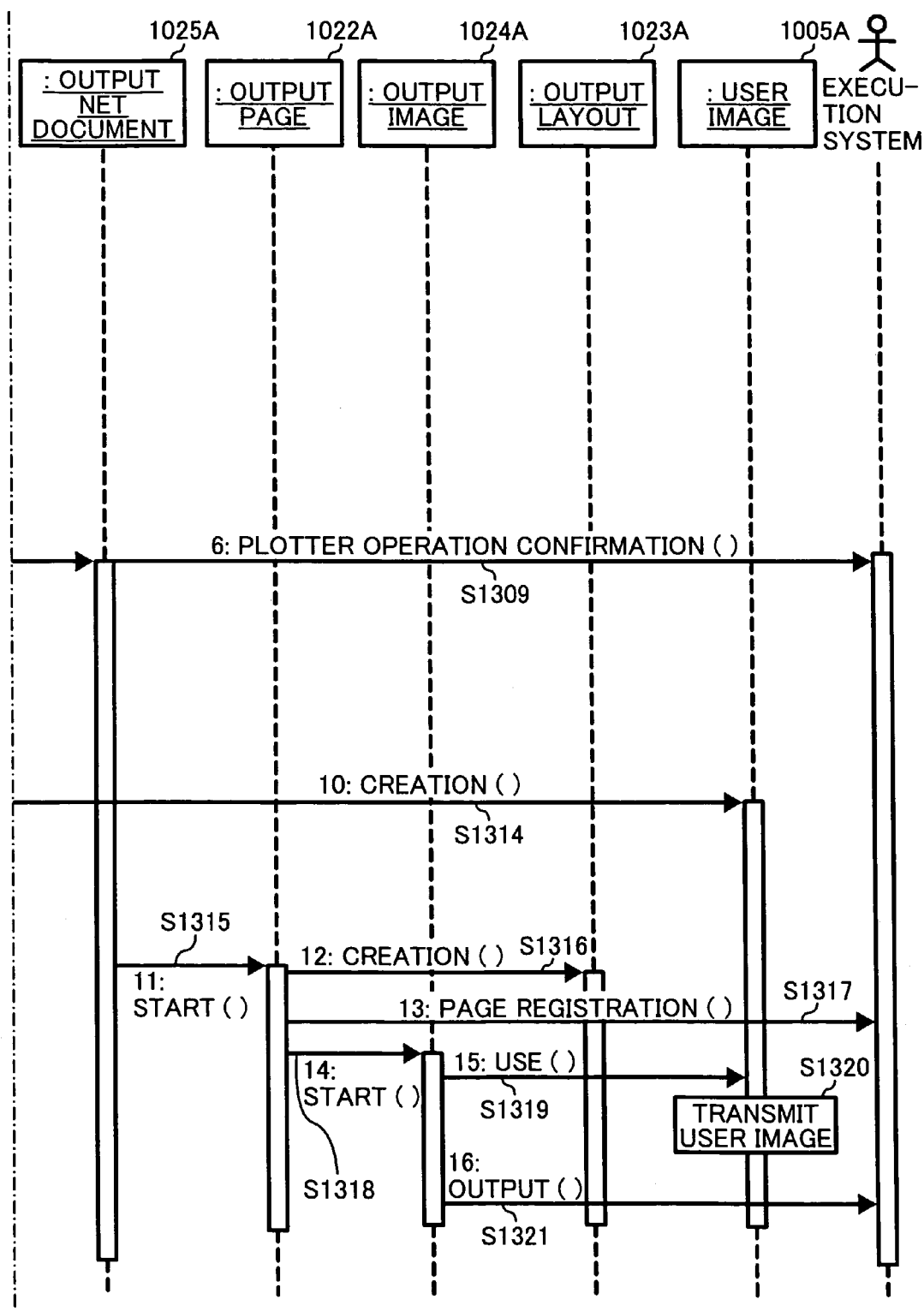

The execution procedure of the operation of the respective classes shown in FIG. 10 is explained again by way of an example. FIG. 13 is a UML sequence diagram of the procedure, when the document handling unit 212 executes the document processing in parallel until read and printing of the paper document are performed.

As shown in FIG. 13, when the user operates the multi-function product 1 to input an intention to print a paper document from the plotter, the operation system sub-system 201 registers the request to perform the document processing input by the user in the document operation scheduler object 1001A (step S1301). It is assumed that the specific processing is the same as the processing at step S1201 in FIG. 12. The document operation scheduler object 1001A determines whether to perform the parallel processing or the serial processing based on the information received as the argument of the registration( ) 1001*a*, and determines which object of the user document sequential class 1004 or of the user document parallel class 1003 to be created based on the determination result (step S1302). In the sequential diagram, it is assumed that it is determined to perform the parallel processing based on the received information.

The document operation scheduler object 1001A calls the start( ) 1002*a*, to request start of the document processing with respect to the created user document parallel object 1003A (step S1303).

The user document parallel object 1003A, to which start of the document processing is requested, calls the parallel processing( ) 1003*a* to perform setting necessary for performing the parallel processing (step S1304). The user document parallel object 1003A specifies the input source received as the argument from the start( ) 1002*a* and creates a sub-class of the input document class 1011 corresponding to the input source (step S1305). In the example shown in the sequence diagram, it is assumed that the input source is a paper document, and an object to be created is an object of the input paper document class 1016, which is the sub-class of the input document class 1011.

The user document parallel object 1003A calls the start( ) 1011*b* of the created input paper document object 1016A to request start of the input processing of the paper document with respect to the input paper document object 1016A (step S1306).

The user document parallel object 1003A specifies the output destination from the information received as the argument from the start( ) 1002*a* at step S1303, and creates a sub-class of the output document class 1021 corresponding to the output destination (step S1307). In the example shown in the sequence diagram, it is assumed that printing is performed by the plotter as the output source, and the object to be created is an object of the output paper document class 1026, which is the sub-class of the output document class 1021.

The user document parallel object 1003A calls the start( ) 1021*b* of the created output paper document object 1026A, to request start of printing from the plotter to the output paper document object 1026A (step S1308). When the start( ) 1021*b* is called, the number of pages 1021*a* of the output net document object 1025A becomes "1", and the number of pages 1021*a* is added by 1, every time the paper document is read by the input paper document object 1016A and the number of pages of the input document increases.

The output net document object 1025A confirms whether the plotter 151*b* operates via the execution system sub-system 203 (step S1309). When the output net document object 1025A cannot confirm the operation of the plotter 151b, the processing is suspended. When the output net document object 1025A can confirm that the plotter 151b operates, the following processing is performed continuously.

As in the processing from step S1207 to step S1211 in FIG. 12, the processing from reading of the paper document to creating the input page object 1012A, the input layout object 1013A, and the input image object 1014A based on the read document, to create the user image by the created user image object 1005A is performed, (steps S1310 to 1314).

Since the output paper document object 1026A performs printing based on the created user image, the output paper document object 1026A creates an output page object 1022A, and calls the start( ) 1022b of the created output page object 1022A, to request start of the output processing for each page of the paper document (step S1315).

Subsequently, the output page object 1022A starts the output processing of the page. At first, the output page object 1022A creates an output layout object 1023A for outputting the page in the format input by the user, and calls the creation( ) 1023a of the created output layout object 1023A, to set an attribute value most suitable for outputting the page in the format input by the user in the attribute of the created output layout object 1023A (step S1316). The output layout object 1023A transmits the information such as the number of output images to be fitted as a message. The output page object 1022A then transmits the information of the output page to the plotter 151b and performs page registration (step S1317).

The output page object 1022A creates the output image objects 1024A for the number of the output images fitted to the output page determined by the output layout object 1023A, and calls the start( ) 1014a of the created output image objects 1024A, to request start of the output processing of the output image to the output image objects 1024A (step S1318).

Subsequently, the output image object 1024A calls the use( ) 1005b of the user image object 1005A, of which correspondence is specified by the information received as the argument of the start( ) 1014a, for example, information of the page number or the order of the output image in the page (step S1319). The user image object 1005A performs processing such as scaling with respect to the output images so as to be fitted to the output layout, and transmits the entity of the held images to the output image objects 1024A, which has performed calling (step S1320).

The output image object 1024A performs processing such as scaling with respect to the received image so as to be fitted to the layout of the output document, and transmits the entity of the received image to the plotter 151b (step S1321).

The input paper document object 1016A calls the next document presence confirmation( ) 10116b, and confirms whether there is the next document from the scanner 151a (step S1322). When there is the next document, the input paper document object 1016A creates the input page object 1012A again and starts the processing from step S1310. When there is no next document, the input paper document object 1016A transmits a message indicating that the input processing by the user document parallel object 1003A has finished to the document operation scheduler object 1001A, to finish the processing.

When having received the message indicating that the input processing has finished, the user document parallel object 1003A performs processing for finishing the document processing and transmits a message indicating that the document processing has finished to the document operation scheduler object 1001A, to finish the processing.

As shown in the sequence diagrams in FIGS. 12 and 13, in the embodiment, the document handling unit 212 includes the document operation scheduler class 1001, the user document sequential class 1004, the input document class 1011 and the sub-class of the input document class 1011, the input page class 1012, the input layout class 1013, the input image class 1014, the output document class 1021 and the sub-class of the output document class 1021, the output page class 1022, the output image class 1024, the output layout class 1023, and the user image class 1005 for performing the document processing. Since the processing of the document from the input processing to the output processing is performed by the objects created by the respective classes, processing can be performed easily in response to a user's request. Furthermore, the mechanism of the document handling unit 122 is constructed according to the object-oriented design, to perform object modeling based on the concept as shown in FIG. 7, and the classes described above are used as the class required for document processing, thereby realizing the document handling unit 122. Accordingly, software developers and software maintenance personnel can easily understand the configuration and the role of the document handling unit 122, and can perform document processing with high generality and reliability.

The document processing program executed by the image forming apparatus in the embodiment can be provided in an installable format or an executable format recorded on a computer readable recording medium such as a compact disc read only memory (CD-ROM), a flexible disk (FD), a CD recordable (CD-R), or a digital versatile disk (DVD). In this case, the CPU 11 reads the document processing program from the recording medium to load the program on the MEM-P 12, thereby realizing the respective steps, respective units, or respective parts in the image forming apparatus.

The document processing program can be stored on a computer connected to the network such as the Internet, and provided by downloading the program via the network. Furthermore, the document processing program can be provided or distributed via the network such as the Internet.

The above configuration shows only one example of the document processor, the document processing method, and the document processing program of the present invention, and the present invention is not limited to the configuration.

In the embodiment, the document is not limited to the "paper" document, the "net" document, and the "LS" document, and can be the one using an optical or magnetic medium (a CD-ROM/RAM, a DVD-ROM/RAM, a magnetic tape, a floppy disk, or a smart card), infrared rays (IrDA), or voice.

The document handling unit 122 in the embodiment holds the document processing requests from users in a combination of an input source and an output destination (for example, a paper document is input and then output onto a local storage). Accordingly, complicated requests from users can be flexibly handled. Furthermore, since one or a plurality of the input document and the output document can be selected in an optional combination according to user's requests, the setting which the multifunction product 1 can accept for input/output increases.

The document handling unit 122 in the embodiment is divided and designed for each object, so as to have the above configuration. Accordingly, when the program is changed, only the class relevant thereto needs only to be changed. Accordingly, the workload can be reduced according to the configuration, as compared to the conventional configuration in which the workload of the designer increases with an expansion of the function.

Conventionally, the part that performs document processing has been designed for each application. However, since it is not necessary to perform the processing for each application according to the above configuration, the designing efficiency is improved. Furthermore, when the document processing is performed for each application, there is a problem in that even though the same setting is made for each output destination, a document in a different layout (as a specific example, a document having a different header or footer space) is output for each output destination due to a difference in the processing in each application. However, since the document handling unit 212 in the embodiment has the above configuration, it is not necessary to perform the processing for each application, and hence, the problem of outputting documents in different layouts can be solved, thereby improving the reliability.

By having the above configuration according to the present invention, when the input source or the output destination increases, the function can be expanded only by adding a sub-class of the input document class 1011 corresponding to the input source or the output document class 1021 corresponding to the output destination, as compared to the conventional configuration in which the function relating to the input source or the output destination needs to be added. Accordingly, the workload when adding a new function can be reduced.

According to the present invention, even when a document is input from different input units, the input document unit converts the document to a predetermined format, and when the document is output, the output document unit reshapes the document in an output format suitable for each output unit and outputs the reshaped document. Accordingly, a difference in the input units and the output units can be absorbed, to make common the processing of the document information.

According to the present invention, since processing is possible for each input image divided according to the input frame information for each input page as the input document information, processing becomes easy.

According to the present invention, arrangement of each output image can be determined according to the output frame information for each output page as the output document information to be output. Therefore, arrangement of the output images in the output document information becomes easy corresponding to a user's request, and hence, the output document information can be created easily in response to the user's request.

According to the present invention, since the processing from input to output can be performed sequentially, appropriate processing becomes possible in response to the user's request, thereby improving the convenience.

According to the present invention, since the processing from input to output can be performed in parallel, appropriate processing becomes possible in response to the user's request, thereby improving the convenience.

According to the present invention, even an input document information input from different input units is converted to a predetermined format and managed, and at the time of output, the output document information reshaped in the output format is created and output. Therefore, a difference of the input units and the output units is absorbed, and the processing of the document information can be made common.

According to the present invention, since the input page information constituting the input document information is formed of input images divided by the input frame information. Accordingly, processing can be performed for each input image, thereby facilitating the processing.

According to the present invention, the output page information constituting the output document information is formed of output images divided according to the output frame information. Accordingly, at the time of output, arrangement can be determined for each output image, thereby facilitating the processing for reshaping the document in the output format. Accordingly, arrangement of the output images in the output document information can be facilitated in response to the user's request, thereby facilitating creation of the output document information in response to the user's request.

According to the present invention, the document processing method according to the invention can be realizing by a computer, which reads and executes the method, and hence the same effects as those of the respective document processing methods can be obtained.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A document processor having a plurality of input units and a plurality of output units, each input unit and each output unit corresponding to a specific function, comprising:
   an input document unit capable of holding pieces of input document information converted to a predetermined common format regardless of the input units, after input processing is performed by the input units;
   a user document unit obtaining user images of a predetermined size to be processed, which are created based on the input document unit, and capable of holding the user images as pieces of user document information formed of the obtained user images; and
   an output document unit that reshapes an output image in a format to be output from at least one of the output units by using the output image created from the user images held in the user document unit to output the reshaped output image and can hold the output images as pieces of output document information to be output.

2. The document processor according to claim 1, comprising:
   an input page unit created for each page input by the input document unit and capable of holding pieces of input page information;
   an input layout unit created corresponding to the input page unit, and corresponding to input frame information used at the time of determining the arrangement for each input page; and
   an input image unit created corresponding to the input page unit and capable of holding a plurality of input images divided according to the arrangement determined by the input layout unit,
   wherein the user document unit obtains the user images of a predetermined size to be processed, which are created based on the input document unit, and is formed of the obtained user images.

3. The document processor according to claim 1, comprising:
   an output page unit created for each page output by the output document unit, and capable of holding pieces of page information to be output;
   an output layout unit created corresponding to the output page unit, and corresponding to output frame information used at the time of determining the arrangement for each page to be output; and
   an output image unit created corresponding to the output page unit and capable of holding a plurality of output images created according to the arrangement determined by the output layout unit and by using the user images held in the user document unit,
   wherein the output document unit uses the output image unit to reshape the output image in a format output from the output unit and output the reshaped output image.

4. The document processor according to claim 1, comprising:
   a document sequential processor that controls the processing to be executed sequentially, in which the input document unit inputs all input documents to be input from the input units, the user document unit obtains the user images created based on the input document unit, and the output document unit reshapes the documents in a format to be output from the output unit by using the output image created from the user images constituting the user document and outputs the reshaped document.

5. The document processor according to claim 1, comprising:
a document parallel processor that controls the processing to be executed in parallel, in which the input document unit inputs a part of input documents to be input from the input units, the user document unit obtains the user images created based on the input document unit, and the output document unit reshapes the documents in a format to be output from the output unit by using the output image created from the user images constituting the user document unit and outputs the reshaped document.

6. An image forming apparatus having a plurality of input units and a plurality of output units, each input unit and each output unit corresponding to a specific function, comprising:
an input document unit capable of holding pieces of input document information converted to a predetermined common format regardless of the input units, after input processing is performed by the input units;
a user document unit obtaining user images of a predetermined size to be processed, which are created based on the input document unit, and capable of holding the user images as pieces of user document information formed of the obtained user images; and
an output document unit that reshapes the output image in a format to be output from at least one of the output units by using the output image created from the user images held in the user document unit to output the reshaped output image and can hold the output images as pieces of output document information to be output.

7. A document processing method comprising:
converting input document information input from one or more of a plurality of input units to a common predetermined format regardless of the input units and managing the input document information;
obtaining user images of a predetermined size to be processed from the input document information managed at the input document step and managing user document information formed of the obtained user images; and
using an output image created from the user images constituting the user document information managed at the obtaining, to create output document information reshaped in a format to be output from at least one of a plurality of output units, and outputting the output document information.

8. The document processing method according to claim 7, comprising:
first managing input page information obtained by dividing the input document information managed at the converting into each page;
first creating input frame information used at the time of determining the arrangement in the input page information managed at the managing; and
second managing input images obtained by dividing the input page information managed at the first managing according to the arrangement determined by the input frame information created at the first creating,
wherein at the obtaining, the input images managed at the first managing are obtained as the user images of the predetermined size to be processed, and the user document information formed of the obtained user images are managed.

9. The document processing method according to claim 7, comprising:
third managing output page information obtained by dividing the output document information to be output by the using into each page;
second creating output frame information used at the time of determining the arrangement in the output page information managed at the third managing; and
obtaining the output image created from the user images constituting the user document information managed at the obtaining, and fitting the output image to the arrangement determined by the output frame information created at the second creating for the output page managed at the third managing,
wherein at the using, the output document information reshaped in a format to be output from the output unit is created by using the output images fitted to the output frame information by the output image unit is created and output.

10. The document processing method according to claim 7, wherein at the converting, all of the input document information to be input from the input unit is input,
at the obtaining, user document information formed of the user images created based on all the input document information input at the converting is created, and
at the using, after creating the user document information at the obtaining, the output image created from the user images constituting the user document is used to create output document information reshaped in a format to be output from the output unit and the output document information is output.

11. The document processing method according to claim 7, wherein at the converting, a part of the input document information to be input from the input unit is input,
at the obtaining, user document information formed of the user images created based on the part of the input document information input at the converting is created, and
at the using, the output image created from the user images constituting the user document created at the obtaining is used to create output document information reshaped in a format to be output from the output unit and the output document information is output,
wherein at the converting, the input processing of another part different from the part of the input document is started by the input unit, regardless of whether to create the output document information at the using.

12. A computer-readable recording medium that stores therein a computer program that causes a computer to execute, comprising:
converting input document information input from one or more of a plurality of input units to a common predetermined format regardless of the input units and managing the input document information;
obtaining user images of a predetermined size to be processed from the input document information managed at the input document step and managing user document information formed of the obtained user images; and
using an output image created from the user images constituting the user document information managed at the obtaining, to create output document information reshaped in a format to be output from at least one of a plurality of output units, and outputting the output document information.

* * * * *